(12) United States Patent
Wang

(10) Patent No.: US 11,901,513 B2
(45) Date of Patent: Feb. 13, 2024

(54) ELECTROLYTE AND ELECTROCHEMICAL DEVICE COMPRISING THE SAME

(71) Applicant: Ningde Amperex Technology Limited, Ningde (CN)

(72) Inventor: Kefei Wang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 17/326,131

(22) Filed: May 20, 2021

(65) Prior Publication Data

US 2021/0280911 A1 Sep. 9, 2021

Related U.S. Application Data

(63) Continuation of application No. 16/212,033, filed on Dec. 6, 2018, now Pat. No. 11,024,884.

(30) Foreign Application Priority Data

Sep. 21, 2018 (CN) .......................... 201811106537.0

(51) Int. Cl.
*H01M 10/0569* (2010.01)
*H01M 4/13* (2010.01)
(Continued)

(52) U.S. Cl.
CPC ......... *H01M 10/0569* (2013.01); *H01M 4/13* (2013.01); *H01M 10/0525* (2013.01);
(Continued)

(58) Field of Classification Search
CPC ......... H01M 10/0569; H01M 10/0525; H01M 10/0567; H01M 10/48; H01M 4/13; H01M 2300/0025; H01M 2300/0037
See application file for complete search history.

(56) References Cited

U.S. PATENT DOCUMENTS 6,314,638 B1 11/2001 Kaido et al.
9,812,739 B2 11/2017 Wang
(Continued)

FOREIGN PATENT DOCUMENTS

| CN | 1744369 | 3/2006 |
|---|---|---|
| CN | 101192682 | 6/2008 |

(Continued)

OTHER PUBLICATIONS

KR101195931MT (Year: 2012).*
(Continued)

*Primary Examiner* — Alexander Usyatinsky
(74) *Attorney, Agent, or Firm* — Maier & Maier, PLLC

(57) ABSTRACT

An electrolyte includes a fluorinated cyclic carbonate, a chain carboxylate and a multi-nitrilemulti-nitrile compound having an ether bond. Based on a total weight of the electrolyte, a weight percentage ($C_f$) of the fluorinated cyclic carbonate is greater than a weight percentage ($C_n$) of the multi-nitrilemulti-nitrile compound having an ether bond. The electrolyte can control the expansion of the electrochemical device, so that the electrochemical device has excellent cycle, storage and/or floating-charge performance.

22 Claims, 2 Drawing Sheets

(51) Int. Cl.
  *H01M 10/0525* (2010.01)
  *H01M 10/0567* (2010.01)
  *H01M 10/48* (2006.01)

(52) U.S. Cl.
  CPC ....... *H01M 10/0567* (2013.01); *H01M 10/48* (2013.01); *H01M 2300/0025* (2013.01)

(56) References Cited

U.S. PATENT DOCUMENTS

| | | | | |
|---|---|---|---|---|
| 2006/0035144 | A1* | 2/2006 | Shimizu | H01M 10/0565 429/188 |
| 2011/0059356 | A1 | 3/2011 | Ogasawara et al. | |
| 2013/0157116 | A1 | 6/2013 | Hong et al. | |
| 2014/0322596 | A1 | 10/2014 | Shatunov et al. | |
| 2016/0301103 | A1 | 10/2016 | Kim et al. | |
| 2017/0018803 | A1 | 1/2017 | Wang et al. | |
| 2017/0025706 | A1 | 1/2017 | Dahn et al. | |
| 2017/0125845 | A1 | 5/2017 | Yu et al. | |
| 2017/0288268 | A1* | 10/2017 | Kim | H01M 10/0569 |
| 2017/0324116 | A1* | 11/2017 | Ohashi | H01M 10/0567 |
| 2017/0346136 | A1 | 11/2017 | Wang | |
| 2018/0034105 | A1 | 2/2018 | Ohashi et al. | |
| 2018/0108947 | A9 | 4/2018 | Zhuang | |
| 2018/0191027 | A1 | 7/2018 | Ohara et al. | |
| 2018/0233778 | A1 | 8/2018 | Park et al. | |
| 2018/0254525 | A1 | 9/2018 | Xia et al. | |
| 2019/0245245 | A1 | 8/2019 | Zhang et al. | |
| 2021/0273264 | A1 | 9/2021 | Wang | |
| 2021/0273265 | A1 | 9/2021 | Wang | |
| 2021/0280912 | A1 | 9/2021 | Wang | |

FOREIGN PATENT DOCUMENTS

| | | | |
|---|---|---|---|
| CN | 101621139 | | 1/2010 |
| CN | 101640290 | | 2/2010 |
| CN | 101901906 | A | 12/2010 |
| CN | 102244294 | | 11/2011 |
| CN | 102522590 | | 6/2012 |
| CN | 103633371 | * | 3/2013 |
| CN | 103222102 | | 7/2013 |
| CN | 103348516 | | 10/2013 |
| CN | 103401020 | | 11/2013 |
| CN | 103518285 | | 1/2014 |
| CN | 103560266 | A | 2/2014 |
| CN | 103633371 | | 3/2014 |
| CN | 103682416 | | 3/2014 |
| CN | 103779607 | | 5/2014 |
| CN | 103928708 | | 7/2014 |
| CN | 103956517 | | 7/2014 |
| CN | 104332653 | * | 2/2015 |
| CN | 104505535 | | 4/2015 |
| CN | 104752769 | | 7/2015 |
| CN | 104766995 | | 7/2015 |
| CN | 104979589 | | 10/2015 |
| CN | 105074993 | | 11/2015 |
| CN | 105098237 | | 11/2015 |
| CN | 105304904 | | 2/2016 |
| CN | 105355968 | | 2/2016 |
| CN | 105355975 | | 2/2016 |
| CN | 105529498 | | 4/2016 |
| CN | 105552440 | | 5/2016 |
| CN | 105609874 | | 5/2016 |
| CN | 105680088 | | 6/2016 |
| CN | 105826600 | A | 8/2016 |
| CN | 105895957 | | 8/2016 |
| CN | 105895958 | | 8/2016 |
| CN | 106058317 | | 10/2016 |
| CN | 106058319 | | 10/2016 |
| CN | 106099185 | | 11/2016 |
| CN | 106450169 | A | 2/2017 |
| CN | 106654128 | | 5/2017 |
| CN | 106784589 | | 5/2017 |
| CN | 106816633 | | 6/2017 |
| CN | 107104245 | | 8/2017 |
| CN | 107275553 | | 10/2017 |
| CN | 107394269 | | 11/2017 |
| CN | 107408734 | | 11/2017 |
| CN | 108242567 | | 7/2018 |
| CN | 108550914 | | 9/2018 |
| CN | 109301326 | | 2/2019 |
| JP | 2016143536 | A | 8/2016 |
| JP | 2017022108 | | 1/2017 |
| JP | 2018120854 | | 8/2018 |
| JP | 2018133332 | | 8/2018 |
| KR | 1020080082276 | A | 9/2008 |
| KR | 101195931 | * | 10/2012 |
| KR | 20170051286 | | 5/2017 |
| WO | 2013097474 | | 7/2013 |
| WO | 2015179210 | A1 | 11/2015 |
| WO | 2016188884 | | 12/2016 |
| WO | 2018073694 | A2 | 4/2018 |

OTHER PUBLICATIONS

Qiang Ma et al. "Highly Conductive Electrolytes Derived from Nitrile Solvents" Journal of the Electrochemical Society, 162 (7) A1276-A1281 (2015) (Year: 2015).*
CN103633371MT (Year: 2013).*
CN104332653MT (Year: 2015).*
Notification to Grant Patent (Year: 2022).*
Wang, Kefei; European Search Report for Application No. 19177715.0, filed, May 31, 2019, dated Nov. 18, 2019, 11 pages.
Wang, Kefei; Extended European Search Report for Application No. 19198416.0, filed, Sep. 29, 2019, dated Jan. 14, 2020, 6 pages.
Wang, Kefei; First Office Action and for Chinese Application No. 201811106537.0, filed, Sep. 21, 2018, dated Dec. 27, 2019, 12 pages.
Wang, Kefei; First Office Action and Search Report for Chinese Application No. 202010620677.0, filed, Sep. 21, 2018, dated Mar. 26, 2021, 10 pages.
Wang, Kefei; First Office Action and Search Report for Chinese Application No. 202010622852.X, filed, Sep. 21, 2018, dated Mar. 26, 2021, 13 pages.
Wang, Kefei; First Office Action and Search Report for Chinese Application No. 202010622890.5, filed, Sep. 21, 2018, dated Apr. 14, 2021, 11 pages.
Wang, Kefei; First Office Action and Search Report for Chinese Application No. 202010622903.9, filed, Sep. 21, 2018, dated Apr. 13, 2021, 11 pages.
Wang, Kefei; First Office Action for Chinese Application No. 201811108529.X, filed, Sep. 21, 2018, dated Jan. 19, 2020, 12 pages.
Hong et al., "Effect of ethylene glycol bis(propionitrile) either on high-voltage Li-ion battery," Battery Bimonthly, vol. 47, No. 1, pp. 35-38, Feb. 28, 2017, with 1 page English abstract.
Hong et al., "Enhancing Electrochemical Performance of High Voltage (4.5V) Graphite/LiNi0.5Co0.2Mn0.3O2 Cell by Tailoring Cathode Interface," Journal of Electrochemical Society, vol. 164, No. 2, pp. A137-A144, Dec. 15, 2016.
Qisheng, Wu, "New Energy Materials", pp. 77-80, Jun. 30, 2017, East China University of Science and Technology Press, Shanghai, China.
Wang, Kefei; Communication Under Rule 71(3) EPC for Application No. 19177715.0, filed May 31, 2019, dated Oct. 21, 2021, 60 pages.
Wang, Kefei; Notification to Grant for Chinese Application No. 202010622903.9, filed Sep. 21, 2018, dated Sep. 5, 2022, 4 pages.
Wang, Kefei; Supplemental Search Report for Chinese Application No. 202010622852.X, filed Sep. 21, 2018, dated Oct. 19, 2022, 5 pages.
Wang, Kefei; Second Office Action and Search Report for Chinese Application No. 202010622903.9, filed, Sep. 21, 2018, dated Jun. 17, 2021, 16 pages.
Wang, Kefei; Second Office Action and Search Report for Chinese Application No. 202010620677.0, filed, Sep. 21, 2018, dated Sep. 28, 2021, 12 pages.

(56) References Cited

OTHER PUBLICATIONS

Wang, Kefei; Second Office Action and Search Report for Chinese Application No. 202010622890.5, filed, Sep. 21, 2018, dated Aug. 26, 2021, 16 pages.
Wang, Kefei; Second Office Action for Chinese Application No. 202010622852.X, filed, Sep. 21, 2018, dated Aug. 18, 2021, 13 pages.
Wang, Kefei; Third Office Action and Search Report for Chinese Application No. 202010622903.9, filed, Sep. 21, 2018, dated Sep. 6, 2021, 22 pages.
Wang, Kefei; Third Office Action for Chinese Application No. 202010622852.X, filed, Sep. 21, 2018, dated Dec. 29, 2021, 10 pages.
CN 103633371 MT (Year: 2015).
Wang, Kefei; Non-Final Office Action for U.S. Appl. No. 17/326,165, filed May 20, 2021, dated Aug. 16, 2022, 25 pgs.
Wang, Kefei; Non-Final Office Action for U.S. Appl. No. 17/326,187, filed May 20, 2021, dated Aug. 17, 2022, 25 pgs.
Ningde Amperex Technology Limited; Extended European Search Report for application No. 21193606.7, dated Dec. 6, 2021, 8 pgs.
Ningde Amperex Technology Limited; Extended European Search Report for application No. 21193610.9, dated Dec. 6, 2021, 9 pgs.
Ningde Amperex Technology Limited; Extended European Search Report for application No. 21193613.3, dated Dec. 6, 2021, 9 pgs.
Ningde Amperex Technology Limited; Extended European Search Report for application No. 21193620.8, dated Dec. 6, 2021, 9 pgs.
Ningde Amperex Technology Limited; Office Action for Chinese patent application No. 202010622903.9, dated Feb. 8, 2022, 9 pgs.
Ningde Amperex Technology LTD; Office Action for Chinese patent application No. 202010622852.X, dated Jun. 6, 2022, 17 pgs.
Wang, Kefei; Non-Final Office Action for U.S. Appl. No. 17/326,191, filed May 20, 2021, dated Jul. 27, 2022, 25 pgs.
Ningde Amperex Technology Ltd; Office Action for Chinese patent application No. 202010620677.0, dated Nov. 17, 2021, 7 pgs.
Ningde Amperex Technology Limited; Office Action for Chinese patent application No. 202010622890.5, dated Jan. 25, 2022, 8 pgs.
Ningde Amperex Technology Limited; Office Action for Chinese patent application No. 202010622903.9, dated Sep. 6, 2021, 22 pgs.
Ningde Amperex Technology LTD; Office Action for Chinese patent application No. 201811106537.0, dated May 28, 2020, 6 pgs.
Notification to Grant Patent Right for Invention dated Jan. 25, 2022, in corresponding Chinese Application No. 202010622890.5, 12 pages.
Office Action dated Sep. 6, 2021, in corresponding Chinese Application No. 202010622903.9, 16 pages.
Office Action dated Nov. 19, 2020, in related U.S. Appl. No. 16/212,033, 11 pages.
Office Action dated Jul. 7, 2023, in related U.S. Appl. No. 17/326,165, 23 pages.
Xie et al., "Dinitrile compound containing ethylene oxide moiety with enhanced solubility of lithium salts as electrolyte solvent for high-voltage lithium-ion batteries", Ionics, 2015, vol. 21, pp. 909-915.
Wang, Kefei; Requirement for Restriction/Election for U.S. Appl. No. 17/326,165, filed May 20, 2021, dated Mar. 17, 2023, 17 pgs.
Wang, Kefei; Requirement for Restriction/Election for U.S. Appl. No. 17/326,187, filed May 20, 2021, dated Mar. 13, 2023, 17 pgs.
Wang, Kefei; Final Office Action for U.S. Appl. No. 17/326,191, filed May 20, 2021, dated Mar. 14, 2023, 28 pgs.

\* cited by examiner

ELECTROLYTE AND ELECTROCHEMICAL DEVICE COMPRISING THE SAME

CROSS REFERENCE TO THE RELATED APPLICATIONS

The present application is a continuation application of U.S. patent application Ser. No. 16/212,033, filed on 6 Dec. 2018, which claims the benefit of priority from the China Patent Application No. 201811106537.0, filed on 21 Sep. 2018, the disclosure of which is hereby incorporated by reference in its entirety.

1. FIELD OF THE INVENTION

The present application relates to the technical field of energy storage technologies, and more specifically to an electrolyte and an electrochemical device comprising the electrolyte, particularly a lithium ion battery.

2. BACKGROUND

With the rapid development of intelligent electronic products, increasingly higher requirements are imposed on the energy density of electrochemical devices. Developing a high-voltage electrochemical device is one of the effective methods. However, at a high voltage, the oxidizability of the cathode material is increased, and the stability is lowered, which causes the non-aqueous electrolyte to easily decompose on the surface of the cathode or cause deterioration of the battery material, resulting in a decrease in battery capacity. The phenomenon in which an electrochemical device is continuously charged after full charge such that the electrochemical device is in a state of high charge for a long time is referred to as floating charge. The floating-charge performance of the electrochemical device directly affects its reliability, for example, swelling, extra-thickness and capacity attenuation.

In order to solve the above problems, it is definitely necessary to provide an electrochemical device having excellent cycle, storage, and/or floating-charge performance, which can be attained by providing an improved electrolyte.

SUMMARY

An embodiment of the present application provides an electrolyte and an electrochemical device comprising the electrolyte, to solve at least one of the problems existing in the related art to some extent. The electrolyte of the present application can control the expansion of the electrochemical device, so that the electrochemical device has excellent cycle, storage and/or floating-charge performance.

In one embodiment, the present application provides an electrolyte, which comprises a fluorinated cyclic carbonate and a multi-nitrile compound having an ether bond, where based on the total weight of the electrolyte, the weight percentage ($C_f$) of the fluorinated cyclic carbonate is greater than the weight percentage ($C_n$) of the multi-nitrile compound having an ether bond.

According to the embodiment of the present application, based on the total weight of the electrolyte, $C_f$ is about 0.1 wt %-about 10 wt %, and $C_n$ is about 0.1 wt %-about 5 wt %.

According to the embodiment of the present application, the multi-nitrile compound having an ether bond is selected from a compound represented by General Formula [1]:

General Formula [1]

where:

$R_1$, $R_2$, and $R_3$ each represent —$(CH_2)_a$—CN or —$(CH_2)_b$—O—$(CH_2)_c$—CN;

$R_4$ represents hydrogen, an alkyl group having 1-5 carbon atoms, —$(CH_2)_a$—CN, or —$(CH_2)_b$—O—$(CH_2)_c$—CN;

at least one of $R_1$, $R_2$, $R_3$, and $R_4$ is —$(CH_2)_b$—O—$(CH_2)_c$—CN; and a, b and c are each independently an integer from 0 to 10.

According to the embodiment of the present application, the multi-nitrile compound having an ether bond is selected from at least one of the group consisting of 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, and 1,2,5-tris(cyanoethoxy)pentane.

According to the embodiment of the present application, the multi-nitrile compound having an ether bond further comprises Compound 1A:

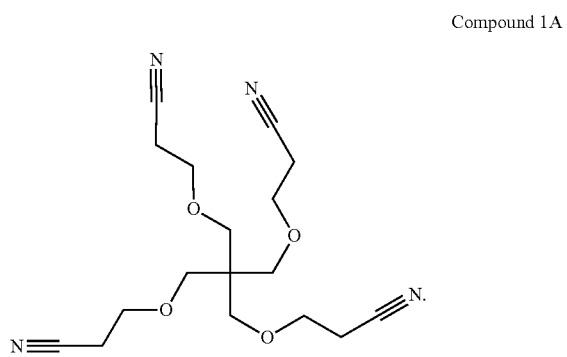 [SMILES: N#CCCOCC(COCCC#N)(COCCC#N)COCCC#N]

Compound 1A

According to the embodiment of the present application, the fluorinated cyclic carbonate is selected from the group consisting of a fluorinated cyclic carbonate having an alkylene group with 2-6 carbon atoms.

According to the embodiment of the present application, the fluorinated cyclic carbonate is selected from at least one of the group consisting of fluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

According to the embodiment of the present application, the electrolyte further comprises a fluoroether selected from compounds of General Formula [2], [3], [4] or [5]:

Rf1—O—Rf2                                 [2],

Rf1—O—R                                    [3],

Rf1—O—(R'—O)$_n$—R                      [5], or a combination thereof,
where:
in Formulas [2], [3], [4], and [5], Rf1 and Rf2 are each independently a linear or branched $C_1$ to $C_{12}$ fluoroalkyl group having at least one hydrogen atom replaced by fluorine, R is a linear or branched $C_1$ to $C_{12}$ alkyl group, and R' is a linear or branched $C_1$ to $C_5$ alkylene group, and n is an integer from 1 to 5.

According to the embodiment of the present application, the electrolyte further comprises a cyclic phosphonic anhydride, which is selected from compounds represented by General Formula [6]:

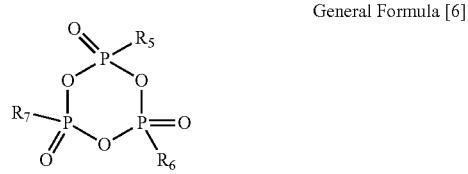

General Formula [6]

where:
$R_5$, $R_6$, and $R_7$ are each independently selected from hydrogen, an alkyl group having 1-20 carbon atoms, and an aryl group having 6-26 carbon atoms; and
$R_5$, $R_6$ and $R_7$ are identical to or different from each other or any two of them are identical.

According to the embodiment of the present application, the electrolyte further comprises at least one of a cyclic carbonate having a carbon-carbon double bond, a fluorinated chain carbonate, a dinitrile compound, and a compound having a sulfur-oxygen double bond.

According to the embodiment of the present application, the electrolyte further comprises at least one of a cyclic carbonate, a chain carbonate, a cyclic carboxylate, a chain carboxylate, a cyclic ether, a chain ether, a phosphorus-based organic solvent, a sulfur-containing organic solvent, and an aromatic fluorine-containing solvent.

In another embodiment, the present application provides an electrochemical device comprising an electrode and the electrolyte as described above.

According to the embodiment of the present application, the electrolyte comprises at least one of ethyl propionate, propyl propionate, and γ-butyrolactone, which is present in a content of about 1 wt %-about 60 wt % based on the total weight of the electrolyte.

According to an embodiment of the present application, the electrolyte comprises propyl propionate, which is present in a content of about 10 wt %-about 50 wt % based on the total weight of the electrolyte.

According to the embodiment of the present application, the electrode comprises a current collector and a coating that is at least one selected from the group consisting of:
a single-sided coating formed by coating a slurry only on one surface of the current collector; and
a double-sided coating formed by coating a slurry on two opposing surfaces of the current collector, where the electrode including the single-sided coating has an electrode compaction density D1, the electrode including the double-sided coating has an electrode compaction density D2, and D1 and D2 satisfy the relationship: about $0.8 \leq D1/D2 \leq$ about 1.2.

According to the embodiment of the present application, the electrodes comprise a cathode and an anode. In some embodiments, when the electrode is a cathode, D2 meets the formula: about 3.5 g/cm³ $\leq D2 \leq$ about 4.3 g/cm³. In some other embodiments, when the electrode is an anode, D2 meets the formula: about 1.2 g/cm³ $\leq D2 \leq 1.8$ g/cm³.

In another embodiment, the present application provides an electronic device including the electrochemical device as described above.

Additional aspects and advantages of the embodiments of the present application will be partially described, illustrated or explained by way of examples in the description which follows.

BRIEF DESCRIPTION OF THE DRAWINGS

The drawings needed for describing the embodiments of the present application or the prior art will be briefly described below to facilitate the description of the embodiments of the present application. Obviously, the drawings in the following description only show some embodiments of the present application. For those skilled in the art, the drawings of other embodiments can be obtained according to the structures illustrated in the drawings without creative efforts.

DETAILED DESCRIPTION

Figure 1:
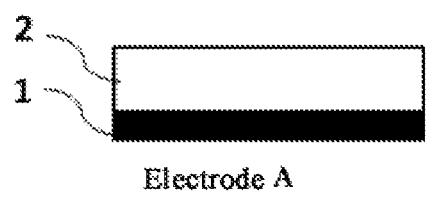
FIG. 1 is a view schematically showing the structure of an electrode A with a single-sided coating according to an embodiment of the present application.

Embodiments of the present application will be described in detail below. Throughout the specification of the present application, the same or similar components and components having the same or similar functions are denoted by like reference numerals. The embodiments described herein with respect to the figures are explanatory, and illustrative, and are provided to facilitate the basic understanding of the application. The embodiments of the present application should not be interpreted as limitations to the present application.

Unless otherwise expressly indicated, the following terms used herein have the meanings indicated below.

The term "about" is used to describe and illustrate small changes. When used in connection with an event or circumstance, the term may refer to an example in which the event or circumstance occurs precisely, and an example in which the event or circumstance occurs approximately. For example, when used in connection with a value, the term may refer to a range of variation less than or equal to ±10% of the said value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other values are sometimes presented in a range format in this application. It should be understood that such a range format is provided for the sake of convenience and simplicity, and should be understood flexibly to comprise not only the numerical values that are explicitly defined in the range, but also all the individual values or sub-ranges that are comprised in the range, as if each value and sub-range are explicitly specified.

The term "hydrocarbon group" encompasses alkyl, alkenyl, and alkynyl groups.

The term "alkyl group" is intended to be a linear saturated hydrocarbon structure having 1 to 20 carbon atoms. The alkyl group is also intended to be a branched or cyclic hydrocarbon structure having 3 to 20 carbon atoms.

When an alkyl group having a specific number of carbon atoms is defined, it is intended to cover all geometric isomers having said carbon number. Therefore, for example, "butyl" refers to n-butyl, sec-butyl, isobutyl, tert-butyl and cyclobutyl; and "propyl" comprises n-propyl, isopropyl and cyclopropyl. Examples of the alkyl group comprise, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl, and the like.

The term "alkenyl group" refers to a monovalent unsaturated hydrocarbon group which may be straight or branched and which has at least one and usually 1, 2 or 3 carbon-carbon double bonds. Unless otherwise defined, the alkenyl group typically contains from 2 to 20 carbon atoms and comprises (for example) a —$C_{2-4}$ alkenyl group, a —$C_{2-6}$ alkenyl group, and a —$C_{2-10}$ alkenyl group. Representative alkenyl groups comprise (for example) ethenyl, n-propenyl, iso-propenyl, n-but-2-enyl, butyl-3-enyl, n-hex-3-enyl, and the like.

The term "alkynyl group" refers to a monovalent unsaturated hydrocarbon group which may be straight or branched and which has at least one and usually 1, 2 or 3 carbon-carbon triple bonds. Unless otherwise defined, the alkynyl group typically contains from 2 to 20 carbon atoms and comprises (for example) a —$C_{2-4}$ alkynyl group, a —$C_{3-6}$ alkynyl group, and a —$C_{3-10}$ alkynyl group. Representative alkynyl groups comprise (for example) ethynyl, prop-2-ynyl (n-propynyl), n-but-2-ynyl, n-hex-3-ynyl, and the like.

The term "alkylene group" refers to a linear or branched divalent saturated hydrocarbon group. Unless otherwise defined, the alkylene group typically contains from 2 to 10 carbon atoms and comprises (for example) —$C_{2-3}$ alkylene and —$C_{2-6}$ alkylene. The representative alkylene group comprises (for example) methylene, ethane-1,2-diyl ("ethylene"), propane-1,2-diyl, propane-1,3-diyl, butane-1,4-diyl, pentane-1,5-diyl and the like.

The term "aryl group" refers to a monovalent aromatic hydrocarbon group having a single ring (for example, phenyl) or a fused ring. The fused ring system comprises a completely unsaturated ring system (for example, naphthalene) and a partially unsaturated ring system (for example, 1,2,3,4-tetrahydronaphthalene). Unless otherwise defined, the aryl group typically contains from 6 to 26 ring carbon atoms and comprises (for example) a —$C_6$-10 aryl group. The representative aryl group comprises (for example) phenyl, methylphenyl, propylphenyl, isopropylphenyl, benzyl and naphthalen-1-yl, naphthalen-2-yl, and the like.

As used herein, the content of each component is based on the total weight of the electrolyte.

I. Electrolyte

The present application provides an electrolyte, which comprises an electrolyte and a solvent in which the electrolyte is dissolved. The electrolyte of the present application is mainly characterized by comprising a fluorinated cyclic carbonate and a multi-nitrile compound having an ether bond.

The inventors of the present application found that a composite solid electrolyte interface film (SEI film) formed of a fluorinated cyclic carbonate and a multi-nitrile compound having an ether bond has low impedance and is insusceptible to decomposition during the cycle of the battery, and thus the interface between the electrolyte and the electrodes is stable.

The electrolyte of the present application is further mainly characterized in that based on the total weight of the electrolyte, the weight percentage ($C_f$) of the fluorinated cyclic carbonate is greater than the weight percentage ($C_n$) of the multi-nitrile compound having an ether bond. When the weight percentages of the fluorinated cyclic carbonate and the multi-nitrile compound having an ether bond conform to the relationship $C_f>C_n$, the thickness expansion of the battery cell can be suppressed. When $C_f$ and $C_n$ satisfy about $0.3 \leq (C_f+C_n) \leq$ about 12 and about $1 \leq (C_f/C_n) \leq$ about 20, the inhibitory effect is more obvious. When $C_f$ and $C_n$ satisfy about $2 \leq (C_f+C_n) \leq$ about 8 and about $2 \leq (C_f/C_n) \leq$ about 10, the inhibitory effect is more particularly obvious.

The electrolyte of the present application plays an important role in controlling the thickness expansion of the battery cell of the electrochemical device during repeated charge/discharge cycles. By using the electrolyte of the present application, electrochemical devices with excellent cycle, storage and/or floating-charge performances can be obtained.

1. Multi-Nitrile Compound Having an Ether Bond

In some embodiments, the multi-nitrile compound having an ether bond is selected from a compound represented by General Formula [1]:

General Formula [1]

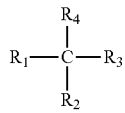

where:

$R_1$, $R_2$, and $R_3$ each represent —$(CH_2)_a$—CN or —$(CH_2)_b$—O—$(CH_2)_c$—CN;

$R_4$ represents hydrogen, an alkyl group having 1-5 carbon atoms, —$(CH_2)_a$—CN, or —$(CH_2)_b$—O—$(CH_2)_c$—CN;

at least one of $R_1$, $R_2$, $R_3$, and $R_4$ is —$(CH_2)_b$—O—$(CH_2)_c$—CN; and a, b and c are each independently an integer from 0 to 10.

In some embodiments, the multi-nitrile compound having an ether bond comprises, but is not limited to, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, and 1,2,5-tris(cyanoethoxy)pentane. In some embodiments, the multi-nitrile compound having an ether bond comprises one or more of those described above.

In some embodiments, the multi-nitrile compound having an ether bond further comprises Compound 1A:

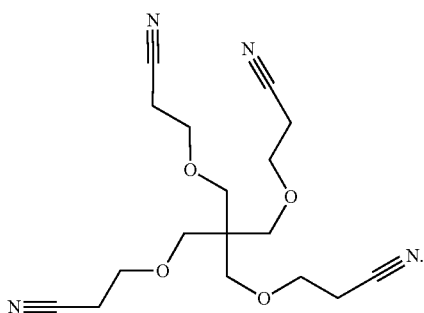

Compound 1A

In some embodiments, the content $C_n$ of the multi-nitrile compound having an ether bond is about 0.1 wt % or more. In some embodiments, $C_n$ is about 0.2 wt % or more. In some embodiments, $C_n$ is about 0.3 wt % or more. In some embodiments, $C_n$ is about 0.5 wt % or more. In some embodiments, $C_n$ is about 5 wt % or less. In some embodiments, $C_n$ is about 4 wt % or less. In some embodiments, $C_n$ is about 3 wt % or less. In some embodiments, $C_n$ is about 0.1 wt % to about 5 wt %.

2. Fluorinated Cyclic Carbonate

In some embodiments, the fluorinated cyclic carbonate is selected from a fluorinated cyclic carbonate having an alkylene group with 2-6 carbon atoms. In some embodiments, the fluorinated cyclic carbonate comprises, but is not limited to, fluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate and 4,4-difluoro-5,5-dimethylethylene carbonate. In some embodiments, the fluorinated cyclic carbonate comprises one or more of those described above.

In some embodiments, the content $C_f$ of the fluorinated cyclic carbonate is about 0.1 wt % or more. In some embodiments, $C_f$ is about 0.2 wt % or more. In some embodiments, $C_f$ is about 0.3 wt % or more. In some embodiments, $C_f$ is about 0.5 wt % or more. In some embodiments, $C_f$ is about 10 wt % or less. In some embodiments, $C_f$ is about 8 wt % or less. In some embodiments, $C_f$ is about 6 wt % or less. In some embodiments, $C_f$ is about 0.1 wt % to about 10 wt %.

3. Fluoroether

In some embodiments, the electrolyte of the present application further comprises a fluoroether that is selected from compounds of General Formula [2], [3], [4] or [5]:

Rf1-O—Rf2   [2],

Rf1-O—R   [3],

Rf1-O—(R'—O)$_n$—Rf2   [4], and

Rf1-O—(R'—O)$_n$—R   [5], or a combination thereof, where:

in Formulas [2], [3], [4], and [5], Rf1 and Rf2 are each independently a linear or branched $C_1$ to $C_{12}$ fluoroalkyl group having at least one hydrogen atom replaced by fluorine, R is a linear or branched $C_1$ to $C_{12}$ alkyl group, and R' is a linear or branched $C_1$ to $C_5$ alkylene group, and n is an integer from 1 to 5.

In some embodiments, fluoroether comprises, but is not limited to: $HCF_2CF_2CH_2OCF_2CF_2H$(FEPE), $(CF_3)_2CFCF(CF_2CF_3)(OCH_3)$(TMMP), $CF_3CHFCF_2CH(CH_3)OCF_2CHFCF_3$(TPTP), $HCF_2CF_2CH_2OCF_2CF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, $HCF_2CF_2OCH_2CH_2CH_2OCF_2CF_2CF_2H$, $CH_3OCH_2CH_2OCH_2CH_2F$, $CH_3OCH_2CH_2OCH_2CF_3$, $CH_3OCH_2CH(CH_3)OCH_2CH_2F$, $CH_3OCH_2CH(CH_3)OCH_2CF_3$, $FCH_2CH_2OCH_2CH_2OCH_2CH_2F$, $FCH_2CH_2OCH_2CH(CH_3)OCH_2CH_2F$, $CF_3CH_2O(CH_2CH_2O)_2CH_2CF_3$, and $CF_3CH_2OCH_2CH(CH_3)OCH_2CF_3$.

The structural formulas of FEPE, TMMP, and TPTP are shown below:

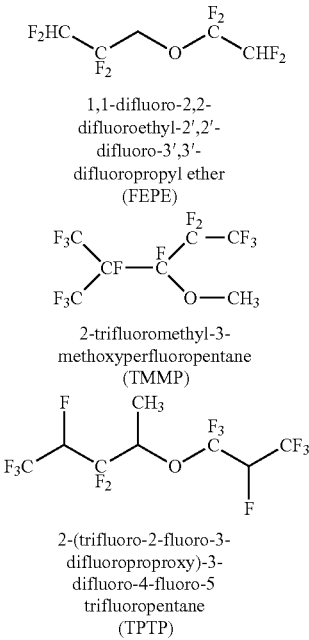

1,1-difluoro-2,2-difluoroethyl-2',2'-difluoro-3',3'-difluoropropyl ether (FEPE)

2-trifluoromethyl-3-methoxyperfluoropentane (TMMP)

2-(trifluoro-2-fluoro-3-difluoroproxy)-3-difluoro-4-fluoro-5 trifluoropentane (TPTP)

In some embodiments, the fluoroether comprises one or more of those described above.

In some embodiments, the content of the fluoroether is about 0.01 wt % or more. In some embodiments, the content of the fluoroether is about 0.1 wt % or more. In some embodiments, the content of the fluoroether is about 0.3 wt % or more. In some embodiments, the content of the fluoroether is about 0.5 wt % or more. In some embodiments, the content of the fluoroether is about 5 wt % or less. In some embodiments, the content of the fluoroether is about 4 wt % or less. In some embodiments, the content of the fluoroether is about 3 wt % or less. In some embodiments, the content of the fluoroether is from about 0.01 wt % to about 5 wt %.

4. Cyclic Phosphonic Anhydride

In some embodiments, the electrolyte of the present application further comprises a cyclic phosphonic anhydride, which is selected from compounds represented by General Formula [6]:

General Formula [6]

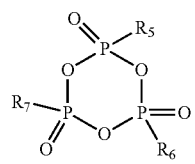

where:

$R_5$, $R_6$, and $R_7$ are each independently selected from hydrogen, an alkyl group having 1-20 carbon atoms, or an aryl group having 6-26 carbon atoms.

In some embodiments, $R_5$, $R_6$ and $R_7$ are each independently selected from methyl, ethyl, n-propyl, iso-propyl, n-butyl, iso-butyl, tert-butyl, n-pentyl, iso-pentyl, n-hexyl, iso-hexyl, cyclopentyl, 3-methylcyclopentyl, 3-ethylcyclopentyl, cyclohexyl, 4-methylcyclohexyl, 4-ethylcyclohexyl, phenyl, benzenemethyl, 4-methylphenyl, 4-propylphenyl or 4-iso-propylphenyl.

In some embodiments, $R_5$, $R_6$ and $R_7$ in General Formula [6] are identical to or different from each other or any two of them are identical.

In some embodiments, the cyclic phosphonic anhydride comprises, but is not limited to, the following structures:

(TM3P)

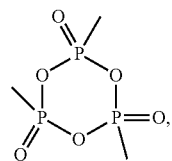

(TE3P)

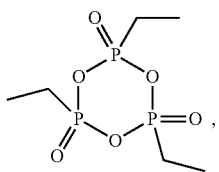

(T3P)

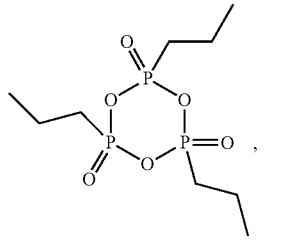

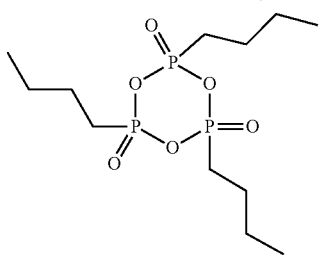

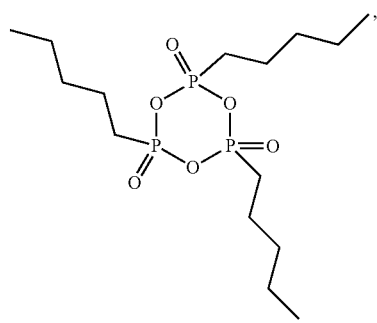

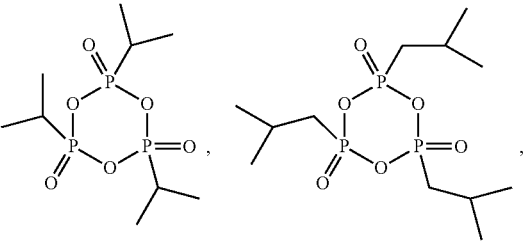

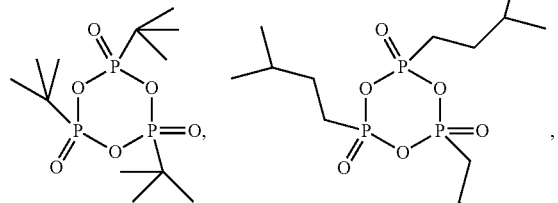

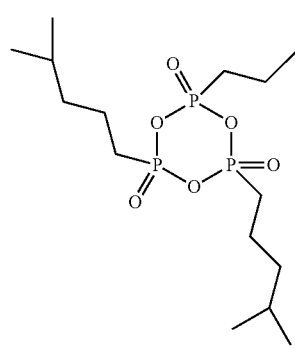

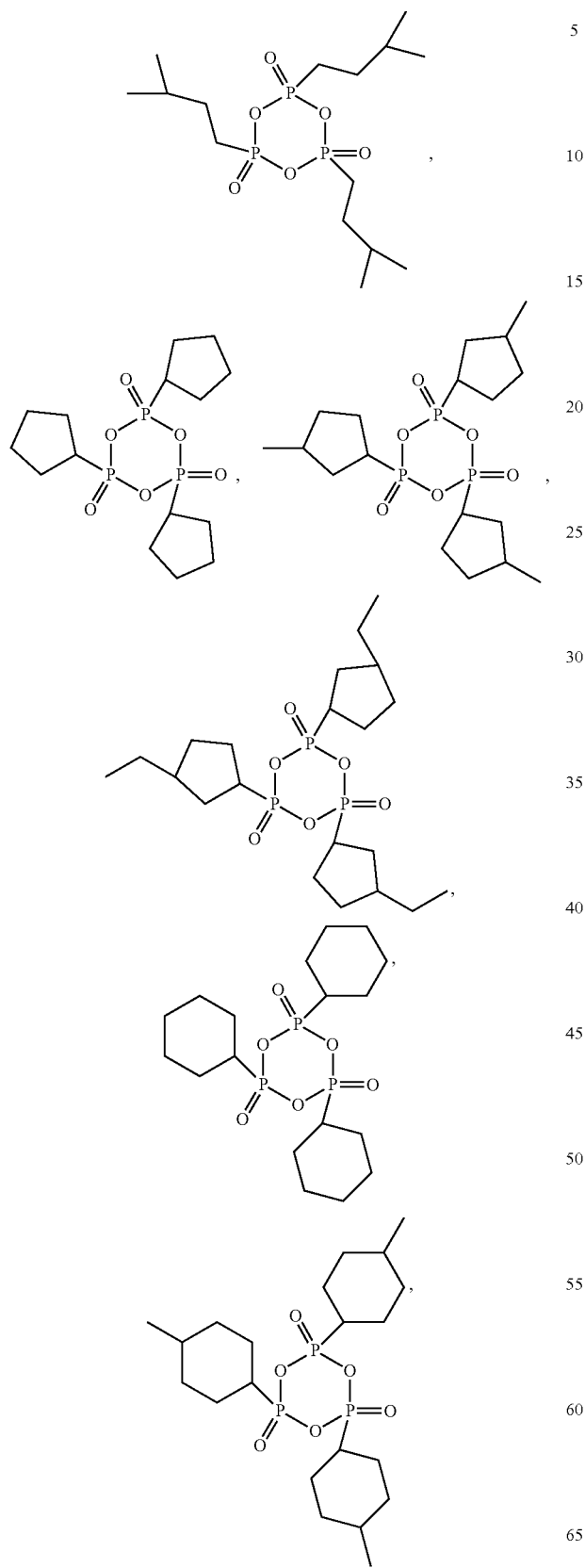
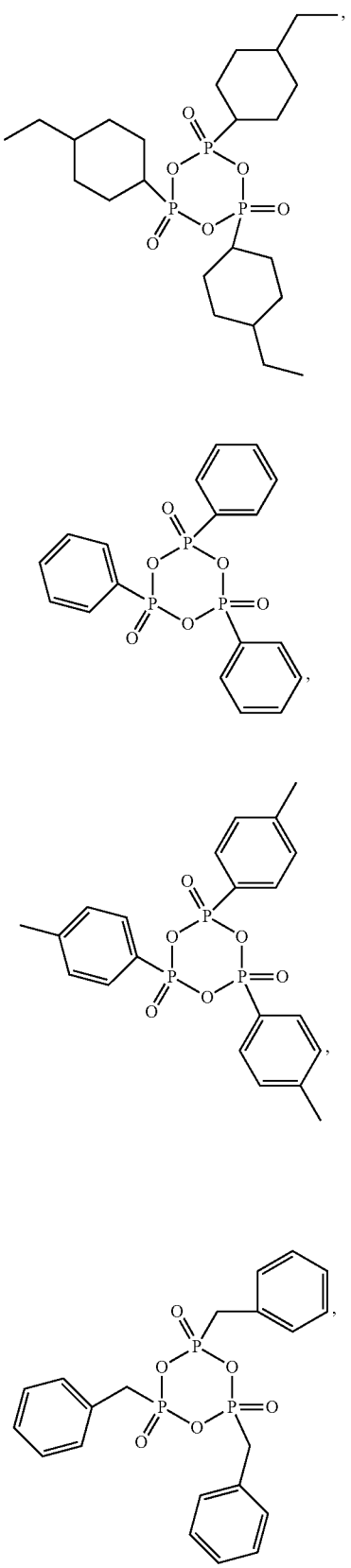

-continued

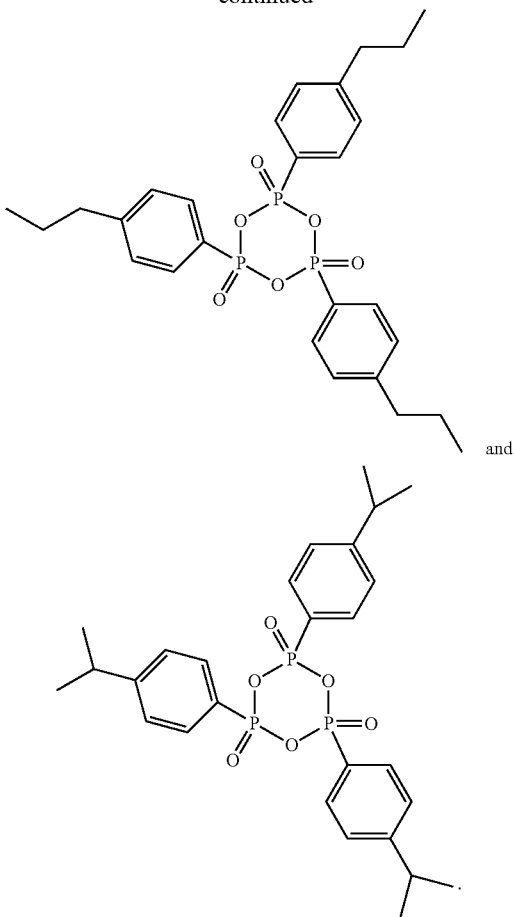

and

In some embodiments, the cyclic phosphonic anhydride comprises one or more of those described above.

In some embodiments, the content of the cyclic phosphonic anhydride is about 0.01 wt % or more. In some embodiments, the content of the cyclic phosphonic anhydride is about 0.1 wt % or more. In some embodiments, the content of the cyclic phosphonic anhydride is about 0.3 wt % or more. In some embodiments, the content of the cyclic phosphonic anhydride is about 0.5 wt % or more. In some embodiments, the content of the cyclic phosphonic anhydride is about 3 wt % or less. In some embodiments, the content of the cyclic phosphonic anhydride is about 0.01 wt % to about 3 wt %.

5. Other additives

In some embodiments, the electrolyte of the present application further comprises at least one of a cyclic carbonate having a carbon-carbon double bond, a fluorinated chain carbonate, a dinitrile compound, and a compound having a sulfur-oxygen double bond. After the above additives are added to the electrolyte of the present application, these additives form, together with the fluorinated cyclic carbonate and the multi-nitrile compound having an ether bond, a strong protective film which is insusceptible to decomposition at the electrode interface of the electrochemical device, thereby further suppressing the increase in DC internal resistance of the electrochemical device, reducing the thickness expansion of the battery cell and thus improving the high-temperature storage performance and/or the capacity retention rate of the electrochemical device.

(1) Cyclic Carbonate Having a Carbon-Carbon Double Bond

In some embodiments, the cyclic carbonate having a carbon-carbon double bond comprises, but is not limited to, vinylene carbonate, methyl vinylene carbonate, ethyl vinylene carbonate, 1,2-dimethyl vinylene carbonate, 1,2-diethyl vinylene carbonate, fluorovinylene carbonate, and trifluoromethylvinylene carbonate; vinyl ethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, and 1,2-divinylethylene carbonate; and 1,1-dimethyl-2-methylene ethylene carbonate, and 1,1-diethyl-2-methylene ethylene carbonate. In some embodiments, the cyclic carbonate having a carbon-carbon double bond comprises one or more of those described above.

In some embodiments, the content of the cyclic carbonate having a carbon-carbon double bond is about 0.01 wt % or more. In some embodiments, the content of the cyclic carbonate having a carbon-carbon double bond is about 0.1 wt % or more. In some embodiments, the content of the cyclic carbonate having a carbon-carbon double bond is about 0.3 wt % or more. In some embodiments, the content of the cyclic carbonate having a carbon-carbon double bond is about 0.5 wt % or more. In some embodiments, the content of the cyclic carbonate having a carbon-carbon double bond is about 5 wt % or less. In some embodiments, the content of the cyclic carbonate having a carbon-carbon double bond is about 3 wt % or less. In some embodiments, the content of the cyclic carbonate having a carbon-carbon double bond is about 0.01 wt % to about 5 wt %.

(2) Fluorinated Chain Carbonate

In some embodiments, the fluorinated chain carbonate comprises, but is not limited to, fluoromethylmetyl carbonate, difluoromethylmethyl carbonate, trifluoromethylmethyl carbonate, trifluoroethylmethyl carbonate, and bis(trifluoroethyl) carbonate. In some embodiments, the fluorinated chain carbonate comprises one or more of those described above.

In some embodiments, the content of the fluorinated chain carbonate is about 0.01 wt % or more. In some embodiments, the content of the fluorinated chain carbonate is about 0.1 wt % or more. In some embodiments, the content of the fluorinated chain carbonate is about 0.3 wt % or more. In some embodiments, the content of the fluorinated chain carbonate is about 0.5 wt % or more. In some embodiments, the content of the fluorinated chain carbonate is about 5 wt % or less. In some embodiments, the content of the fluorinated chain carbonate is about 3 wt % or less. In some embodiments, the content of the fluorinated chain carbonate is about 1 wt % or less. In some embodiments, the content of the fluorinated chain carbonate is about 0.01 wt % to 5 wt %.

(3) Dinitrile Compound

In some embodiments, the dinitrile compound comprises, but is not limited to, succinonitrile, glutaronitrile, adipodinitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylbutanedinitrile, 2-methylglutaronitrile, 2,4-dimethylglutaronitrile, 2,2,4,4-tetramethylglutaronitrile, 1,4-dicyanopentane, 2,5-dimethyl-2,5-hexanedinitrile, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-pimelonitrile, 1,4-bis(cyanoethoxy)butane, ethylene glycol bis(2-cyanoethyl)ether, diethylene glycolbis(2-cyanoethyl)ether, triethylene glycolbis(2-cyanoethyl)ether, tetraethylene glycolbis(2-cyanoethyl)ether, 3,6,9,12,15,18-hexaoxaeicosanoic dinitrile, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, and 1,6-dicyano-2-methyl-5-methyl-3-hexene. In some embodiments, the dinitrile compound comprises one or more of those described above.

In some embodiments, the content of the dinitrile compound is about 0.1 wt % or more. In some embodiments, the content of the dinitrile compound is about 0.5 wt % or more. In some embodiments, the content of the dinitrile compound is about 2 wt % or more. In some embodiments, the content of the dinitrile compound is about 4 wt % or more. In some embodiments, the content of the dinitrile compound is about 15 wt % or less based on the total weight of the electrolyte. In some embodiments, the content of the dinitrile compound is about 10 wt % or less. In some embodiments, the content of the dinitrile compound is about 8 wt % or less. In some embodiments, the content of the dinitrile compound is about 0.1 wt % to about 15 wt %.

(4) Compound Having a Sulfur-Oxygen Double Bond

In some embodiments, the compound having a sulfur-oxygen double bond comprises, but is not limited to, at least one of a cyclic sulfate, a chain sulfate, a chain sulfonate, a cyclic sulfonate, a chain sulfite, and a cyclic sulfite.

In some embodiments, the cyclic sulfate comprises, but is not limited to, 1,2-ethylene sulfate, 1,2-propylene sulfate, 1,3-propylene sulfate, 1,2-butylene sulfate, 1,3-butylene sulfate, 1,4-butylene sulfate, 1,2-pentylene sulfate, 1,3-pentylene sulfate, 1,4-pentylene sulfate, and 1,5-pentylene sulfate. In some embodiments, the cyclic sulfate comprises one or more of those described above.

In some embodiments, the chain sulfate comprises, but is not limited to, dimethyl sulfate, methyl ethyl sulfate, and diethyl sulfate. In some embodiments, the chain sulfate comprises one or more of those described above.

In some embodiments, the chain sulfonate comprises, but is not limited to, a fluorosulfonate such as methyl fluorosulfonate and ethyl fluorosulfonate, methyl methanesulfonate, ethyl methanesulfonate, butyl dimesylate, methyl 2-(methylsulfonyloxy)propionate, and ethyl 2-(methylsulfonyloxy)propionate. In some embodiments, the chain sulfonate comprises one or more of those described above.

In some embodiments, the cyclic sulfonate comprises, but is not limited to, 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone, methylene methanedisulfonate, and ethylene methanedisulfonate. In some embodiments, the cyclic sulfonate comprises one or more of those described above.

In some embodiments, the chain sulfite comprises, but is not limited to, dimethyl sulfite, methyl ethyl sulfite, and diethyl sulfite. In some embodiments, the chain sulfite comprises one or more of those described above.

In some embodiments, the cyclic sulfite comprises, but is not limited to, 1,2-ethylene sulfite, 1,2-propylene sulfite, 1,3-propylene sulfite, 1,2-butylene sulfite, 1,3-butylene sulfite, 1,4-butylene sulfite, 1,2-pentylene sulfite, 1,3-pentylene sulfite, 1,4-pentylene sulfite, and 1,5-pentylene sulfite. In some embodiments, the cyclic sulfite comprises one or more of those described above.

In some embodiments, the content of the compound having a sulfur-oxygen double bond is about 0.01 wt % or more. In some embodiments, the content of the compound having a sulfur-oxygen double bond is about 0.1 wt % or more. In some embodiments, the content of the compound having a sulfur-oxygen double bond is about 0.3 wt % or more. In some embodiments, the content of the compound having a sulfur-oxygen double bond is about 0.5 wt % or more. In some embodiments, the content of the compound having a sulfur-oxygen double bond is about 5 wt % or less. In some embodiments, the content of the compound having a sulfur-oxygen double bond is about 4 wt % or less. In some embodiments, the content of the compound having a sulfur-oxygen double bond is about 3 wt % or less. In some embodiments, the content of the compound having a sulfur-oxygen double bond is about 0.01 wt % to about 5 wt % based on the total weight of the electrolyte.

6. Electrolyte

The electrolyte according to the present application is not limited, and may be any electrolyte known in the art. In some embodiments, the electrolyte comprises, but is not limited to, an inorganic lithium salt, for example, $LiClO_4$, $LiAsF_6$, $LiPF_6$, $LiBF_4$, $LiSbF_6$, $LiSO_3F$, and $LiN(FSO_2)_2$ and the like; a fluorine-containing organic lithium salt, for example, $LiCF_3SO_3$, $LiN(FSO_2)(CF_3SO_2)$, $LiN(CF_3SO_2)_2$, $LiN(C_2F_5SO_2)_2$ cyclic lithium 1,3-hexafluoropropane disulfonimide, cyclic lithium 1,2-tetrafluoroethane disulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$ and the like; and a lithium salt containing a dicarboxylic acid complex, for example, lithium bis(oxalato)borate, lithium difluoro(oxalato)borate, lithium tris(oxalato)phosphate, lithium difluorobis(oxalato)phosphate, and lithium tetrafluoro(oxalato)phosphate and the like. In some embodiments, the electrolyte comprises one or more of those described above. In some embodiments, the electrolyte comprises $LiPF_6$ and $LiBF_4$. In some embodiments, the electrolyte comprises a combination of an inorganic lithium salt such as $LiPF_6$ or $LiBF_4$ and a fluorine-containing organic lithium salt such as $LiCF_3SO_3$, $LiN(CF_3SO_2)_2$, or $LiN(C_2F_5SO_2)_2$. In some embodiments, the concentration of the electrolyte is in the range of about 0.8 mol/L to about 3 mol/L, for example, about 0.8 mol/L to about 2.5 mol/L, about 0.8 mol/L to about 2 mol/L, about 1 mol/L to about 2 mol/L, for example, 1 mol/L, 1.15 mol/L, 1.2 mol/L, 1.5 mol/L, 2 mol/L or 2.5 mol/L.

7. Solvent

The solvent used in the electrolyte of the present application may be any non-aqueous solvent known in the art that can be used as a solvent for an electrolyte.

In some embodiments, the non-aqueous solvent comprises, but is not limited to, a cyclic carbonate, a chain carbonate, a cyclic carboxylate, a chain carboxylate, a cyclic ether, a chain ether, a phosphorus-based organic solvent, a sulfur-containing organic solvent, and an aromatic fluorine-containing solvent.

In some embodiments, the cyclic carbonate comprises, but is not limited to, ethylene carbonate (EC), propylene carbonate (PC), and butylene carbonate. In some embodiments, the cyclic carbonate has 3-6 carbon atoms.

In some embodiments, the chain carbonate comprises, but is not limited to, dimethyl carbonate, ethyl methyl carbonate, diethyl carbonate (DEC), methyl n-propyl carbonate, ethyl n-propyl carbonate, and di-n-propyl carbonate and the like; and a fluorinated chain carbonate, for example, bis(fluoromethyl) carbonate, bis(difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethylmethyl carbonate, 2,2-difluoroethylmethyl carbonate, and 2,2,2-trifluoroethylmethyl carbonate.

In some embodiments, the cyclic carboxylate comprises, but is not limited to, γ-butyrolactone and γ-valerolactone. In some embodiments, some of the hydrogen atoms of the cyclic carboxylate may be substituted with fluorine.

In some embodiments, the chain carboxylate comprises, but is not limited to, methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate and ethyl pivalate. In some embodiments, some of the hydrogen atoms of the chain carboxylate may be substituted with fluorine. In some embodiments, the fluorinated chain carboxylate comprises, but is not limited to, methyl trifluoroacetate, ethyl trifluoroacetate, propyl trifluoroacetate, butyl trifluoroacetate and 2,2,2-trifluoroethyl trifluoroacetate.

In some embodiments, the cyclic ether comprises, but is not limited to, tetrahydrofuran, 2-methyltetrahydrofuran, 1,3-dioxolane, 2-methyl1,3-dioxolane, 4-methyl1,3-dioxolane, 1,3-dioxane, 1,4-dioxane and dimethoxypropane.

In some embodiments, the chain ether comprises, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane and 1,2-ethoxymethoxyethane.

In some embodiments, the phosphorus containing organic solvent comprises, but is not limited to, trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate and tris(2,2,3,3,3-pentafluoropropyl) phosphate.

In some embodiments, the sulfur-containing organic solvent comprises, but is not limited to, sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate and dibutyl sulfate. In some embodiments, some of the hydrogen atoms of the sulfur-containing organic solvent may be substituted with fluorine.

In some embodiments, the aromatic fluorine-containing organic solvent comprises, but is not limited to, fluorobenzene, difluorobenzene, trifluorobenzene, tetrafluorobenzene, pentafluorobenzene, hexafluorobenzene and trifluoromethylbenzene.

In some embodiments, the solvent used in the electrolyte of the present application comprises one or more of those described above. In some embodiments, the solvent used in the electrolyte of the present application comprises a cyclic carbonate, a chain carbonate, a cyclic carboxylate, a chain carboxylate and a combination thereof. In some embodiments, the solvent used in the electrolyte of the present application comprises an organic solvent selected from the group consisting of ethylene carbonate, propylene carbonate, diethyl carbonate, ethyl propionate, propyl propionate, n-propyl acetate, ethyl acetate, and a combination thereof. In some embodiments, the solvent used in the electrolyte of the present application comprises ethylene carbonate, propylene carbonate, diethyl carbonate, ethyl propionate, propyl propionate, γ-butyrolactone, and a combination thereof.

After adding the chain carboxylate and/or the cyclic carboxylate to the electrolyte of the present application, the chain carboxylate and/or the cyclic carboxylate can form a passivated film on the surface of the electrode, thereby improving the capacity retention rate after the intermittent charge cycles of the electrochemical device. In some embodiments, the electrolyte of the present application comprises about 1 wt % to about 60 wt % of the chain carboxylate, the cyclic carboxylate, or a combination thereof. In some embodiments, the electrolyte of the present application comprises about 1 wt % to about 60 wt %, about 10 wt % to about 60 wt %, about 10 wt % to about 50 wt %, and about 20 wt % to about 50 wt % of ethyl propionate, propyl propionate, γ-butyrolactone or a combination thereof. In some embodiments, the electrolyte of the present application comprises about 1 wt % to about 60 wt %, about 10 wt % to about 60 wt %, about 20 wt % to about 50 wt %, about 20 wt % to about 40 wt % or about 30 wt % of propyl propionate.

II. Electrochemical Device

The electrochemical device of the present application comprises any device in which an electrochemical reaction takes place, and specific examples comprise all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device of the present application comprises a cathode having a cathode active material capable of absorbing and releasing metal ions; an anode having an anode active material capable of absorbing and releasing metal ions; and an electrolyte of the present application.

1. Electrolyte

The electrolyte used in the lithium ion battery of the present application is any of the electrolytes described above in the present application. Moreover, the electrolyte used in the lithium ion battery of the present application may comprise other electrolytes falling within the scope of present application.

2. Electrodes (1) Anode

The anode material used in the electrochemical device of the present application, and the construction and manufacturing methods therefor are not particularly limited, and may be any of the techniques disclosed in the prior art. In some embodiments, the anode may be one described in U.S. Pat. No. 9,812,739B, which is incorporated herein by reference in its entirety.

In some embodiments, the anode active material is any substance capable of electrochemically absorbing and releasing a metal ion such as lithium ion. In some embodiments, the anode active material comprises a carbonaceous material, a silicon-carbon material, an alloy material or a lithium-containing metal composite oxide material. In some embodiments, the anode active material comprises one or more of those described above.

In some embodiments, the anode can be made by any method known in the art. In some embodiments, the anode can be formed by adding a binder and a solvent to the anode active material, and if necessary, adding a thickener, a conductive material, a filler, or the like, to prepare a slurry, applying the slurry to a current collector, drying, and then pressing.

In some embodiments, when the anode comprises an alloy material, an anode active material layer can be formed by vapor deposition, sputtering, or plating.

In some embodiments, when the anode comprises lithium metal, an anode active material layer is formed by, for example, a conductive skeleton of a twisted spherical shape and metal particles dispersed in the conductive skeleton, where the conductive skeleton of the twisted spherical shape may have a porosity of about 5% to about 85%, and a protective layer may be further disposed on the anode active material layer of lithium metal.

(2) Cathode

The cathode material used in the electrochemical device of the present application, and the construction and manufacturing methods therefor are not particularly limited, and may be any of the techniques disclosed in the prior art. In some embodiments, the cathode may be one described in U.S. Pat. No. 9,812,739B, which is incorporated herein by reference in its entirety.

In some embodiments, the cathode active material comprises, but is not limited to, a sulfide, a phosphate compound and a lithium-transition metal composite oxide. In some embodiments, the cathode active material comprises a lithium-transition metal compound which has a structure capable of deintercalating and intercalating lithium ions.

In some embodiments, the cathode comprises any of the constructions disclosed in the prior art. In some embodiments, the cathode has the structure described in U.S. Pat. No. 9,812,739B.

In some embodiments, the cathode is prepared by forming a cathode material with a cathode active material layer including a lithium-transition metal compound powder and a binder on a current collector.

In some embodiments, the cathode active material layer is generally produced by dry mixing a cathode material and a binder (and further a conductive material and a thickener if needed) to form flakes, and pressing the obtained flakes on a cathode current collector; or dissolving or dispersing the material in a liquid medium to form a slurry, coating the slurry on a cathode current collector, and drying. In some embodiments, the cathode active material layer comprises any of the materials disclosed in the prior art. In some embodiments, the cathode active material layer comprises materials described in U.S. Pat. No. 9,812,739B.

(3) Electrode Compaction Density

Figure 2:
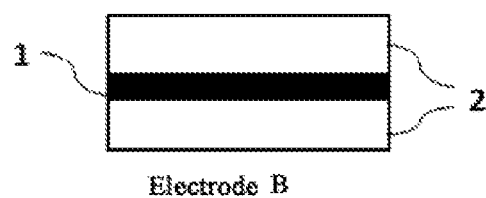
FIG. 2 is a view schematically showing the structure of an electrode B with a double-sided coating according to an embodiment of the present application.
Figure 3:
FIG. 3 is a view schematically showing the structure of an electrode C with hybrid single-sided and double-sided coatings according to an embodiment of the present application.

The electrode used in the electrochemical device of the present application comprises a current collector and a coating including a single-sided coating or a double-sided coating. In some embodiments, as shown by an electrode A in FIG. 1, one side of a current collector 1 is coated with a slurry to form a coating 2 (that is, the electrode comprises only a single-sided coating). In some embodiments, as shown by an electrode B in FIG. 2, two opposing sides of a current collector 1 are coated with a slurry to form a coating 2 (that is, the electrode comprises a double-sided coating). In some embodiments, as shown by an electrode C in FIG. 3, one side of a portion of a current collector 1 is coated with a slurry to form a coating 2 and the two opposing sides of the other portion of the current collector 1 are coated with a slurry to form a coating 2 (that is, the electrode comprises both a single-sided coating and a double-sided coating).

In a wound battery, the cathode and the anode are usually each wound from an elongated electrode, so that both a single-sided coating and a double-sided coating are sometimes present on the elongated electrode. In a laminated battery, the cathode and the anode are usually formed by laminating sheet-like electrodes, and there may be a single-sided coating or a double-sided coating on the electrode. In a battery in which the wound and laminated electrodes are assembled in combination, the cathode and anode generally each comprise an elongated electrode having both a single-sided coating and a double-sided coating, and a sheet-like electrode having only a single-sided coating or a double-sided coating. Generally, both the laminated battery and the wound battery have a single-sided coating and a double-sided coating.

In some embodiments, the electrode has an electrode compaction density. The electrode compaction density is obtained by the following method: determining the thickness of an electrode using a precise measurement tool, such as a ten-thousandths micrometer; then taking the electrode of an area and accurately measuring the area and weight; and calculating the electrode compaction density by a formula below:

Electrode compaction density=(Weight of electrode−Weight of current collector)/Area of electrode/(Thickness of electrode−Thickness of current collector)

A lower electrode compaction density makes the porosity higher, causing some of the particles to be in an insulating state, and be excluded from charge and discharge, resulting in a low specific discharge capacity, thus affecting the performance of the electrochemical device. A too high electrode compaction density may cause difficulty in infiltrability of the electrolyte and a decrease in electrolyte retention, such that the cycle and rate performance cannot be guaranteed. Properly controlling the electrode compaction density of the single-sided and double-sided coatings is very important for obtaining electrochemical devices with high capacity density, and excellent cycle and storage performance. In a high-voltage electrochemical device, the ratio of the electrode compaction density of the single-sided coating to the electrode compaction density of the double-sided coating is one of the main factors affecting the performance of the electrochemical device. A too high or low compaction density ratio will affect the performance of the electrochemical device.

In some embodiments, the electrode with the single-sided coating has an electrode compaction density $D1$, and the electrode with the double-sided coating has an electrode compaction density $D2$, where $D1$ and $D2$ satisfy the relationship: about $0.8 \leq D1/D2 \leq$ about $1.2$. When $D1$ and $D2$ satisfy the relationship, the roles of the cathode and anode active materials are better exerted, the thickness expansion of the battery cell is effectively controlled, and the electrode attains good electrical conductivity. The electrochemical device thus obtained has high capacity density and excellent cycle and storage performance.

In some embodiments, $D1$ and $D2$ further satisfy the relationship: about $0.9 \leq D1/D2 \leq$ about $1.1$. In this case, the performance of the electrochemical device can be further improved.

In some embodiments, $D1$ and $D2$ further satisfy the relationship: about $0.95 \leq D1/D2 \leq$ about $1.05$. In this case, the distribution of pore size and pores in the single-sided coating and the double-sided coating are obviously more uniform, the distribution of the conductive agent and the binder are also more uniform, such that the contact resistance and charge exchange resistance of the electrode are lowered, and the active area participating in the reaction is increased, thereby significantly improving the electrochemical performance of the material and further improving the performance of the electrochemical device.

In some embodiments, the electrode may be a cathode or an anode. When the electrode is a cathode, D2 meets the formula: about 3.5 g/cm$^3$≤D2≤ about 4.3 g/cm$^3$, such that the role of the cathode active material is better exerted and the cathode attains good electrical conductivity. When the electrode is an anode, D2 meets the formula: about 1.2 g/cm$^3$≤D2≤ about 1.8 g/cm$^3$, such that the anode has a higher breaking strength, thereby effectively preventing the electrode particles from falling off during the cycle.

3. Separator

In some embodiments, the electrochemical device of the present application is provided with a separator between the cathode and the anode to prevent a short circuit. The material and shape of the separator used in the electrochemical device of the present application are not particularly limited, and may use any of the techniques disclosed in the prior art. In some embodiments, the separator comprises a polymer or an inorganic substance or the like formed of a material which is stable against the electrolyte of the present application.

For example, the separator may comprise a substrate layer and a surface treatment layer. The substrate layer is a non-woven fabric, film, or composite film having a porous structure, and the material of the substrate layer is at least one selected from polyethylene, polypropylene, polyethylene terephthalate, and polyimide. Particularly, a porous polypropylene film, a porous polyethylene film, a polypropylene nonwoven fabric, a polyethylene nonwoven fabric, and a porous polypropylene-polyethylene-polypropylene composite film may be used.

At least one surface of the substrate layer is provided with a surface treatment layer, which may be a polymer layer or an inorganic layer, or a layer formed by mixing a polymer and an inorganic material.

The inorganic layer comprises inorganic particles and a binder. The inorganic particles are at least one selected from alumina, silica, magnesia, titania, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate, or a combination of more than one thereof. The binder is one selected from polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyvinyl ether, polymethyl methacrylate, polytetrafluoroethylene, and polyhexafluoropropylene, or a combination of more than one thereof.

The polymer layer contains a polymer, and the material of the polymer comprises at least one of a polyamide, polyacrylonitrile, a polyacrylate ester, polyacrylic acid, a polyacrylate salt, polyvinylpyrrolidone, polyvinyl ether, polyvinylidene fluoride or poly(vinylidene fluoride-hexafluoropropylene).

III. Application

The electrolyte according to the present application can inhibit the increase in DC internal resistance of the electrochemical device, so that the electrochemical device thus manufactured is suitable for use in electronic devices in various fields.

The use of the electrochemical device of the present application is not particularly limited and can be used for any purpose known in the art. In an embodiment, the electrochemical device according to the present application is applicable to, but not limited to, notebook computers, pen-input computers, mobile computers, e-book players, portable phones, portable fax machines, portable copiers, portable printers, head-mounted stereo headphones, video recorders, LCD TVs, portable cleaners, portable CD players, mini discs, transceivers, electronic notebooks, calculators, memory cards, portable recorders, radios, backup power sources, motors, vehicles, motorcycles, scooters, bicycles, lighting apparatus, toys, game consoles, clocks, electric tools, flashing light, cameras, large batteries for household use, and lithium ion capacitors.

Examples

The performance evaluation of the lithium ion batteries in the examples and comparative examples of the present application is described below.

1. Preparation of Lithium-Ion Battery (1) Preparation of Anode

Natural graphite, conductive carbon black (Super-P), styrene-butadiene rubber, and sodium carboxymethyl cellulose (CMC) were mixed at a weight ratio of 95:2:2:1 in deionized water as a solvent, and stirred until uniform, to obtain an anode slurry. The anode slurry was coated on a copper foil having a thickness of 12 μm, dried, pressed, and cut, and then a tab was welded, to obtain an anode.

(2) Preparation of Cathode

Lithium cobaltate (LiCoO$_2$), conductive carbon black (Super-P) and polyvinylidene fluoride (PVDF) were mixed at a weight ratio of 95:2:3 in N-methylpyrrolidone (NMP) as a solvent, and stirred until uniform, to obtain a cathode slurry. The cathode slurry was coated on an aluminum foil having a thickness of 12 μm, dried, pressed, and cut, and then a tab was welded, to obtain a cathode.

(3) Preparation of Electrolyte

Under a dry argon atmosphere, to a mixed solvent of EC, PC, and DEC (at a weight ratio of about 1:1:1), then LiPF$_6$ was added and mixed until uniform, to form a basic electrolyte, in which the concentration of LiPF$_6$ was 1.15 mol/L. The electrolytes were configured according to the following Examples and Comparative Examples.

(4) Preparation of Separator

A porous PE polymer film was used as a separator.

(5) Preparation of Lithium-Ion Battery

The obtained cathode, anode and separator were wound in sequence into a lithium ion battery. The lithium ion battery was top-sealed and side-sealed with an aluminum plastic film, with a liquid injection port being left. A lithium ion battery was fabricated by injecting the electrolyte via the liquid injection port, encapsulating, then forming, and capacity grading.

2. Test method (1) Test Method for Floating-Charge Performance of Lithium Ion Battery The lithium ion battery was discharged to 3.0V at 0.5 C, charged to 4.45 V at 0.5 C and then to 0.05 C at a constant voltage of 4.45 V at 25° C., placed in an oven at 50° C., and continuously charged to a cut-off current of 20 mV at a constant voltage of 4.45 V. The thickness change of the battery cell was monitored. The initial thickness at 50% State of Charge (SOC) was used as a reference, and an increase in battery thickness of more than 20% was considered a point of failure.

(2) Test Method for High-Temperature Storage Performance of Lithium Ion Battery

The lithium ion battery was allowed to stand at 25° C. for 30 minutes, charged to 4.45 V at a constant current of 0.5 C and then to 0.05 C at a constant voltage of 4.45 V, allowed to stand for 5 minutes, and then stored at 60° C. for 21 days. The thickness of the battery cell was measured and the thickness expansion rate of the battery cell was calculated by a formula below:

Thickness expansion rate=[(Thickness after storage−Thickness before storage)/Thickness before storage]×100%

(3) Test Method for Capacity Retention Rate of Lithium Ion Battery

At 45° C., the lithium ion battery was charged to 4.45 V at a constant current of 1 C and then to a current of 0.05 C at a constant voltage, discharged to 3.0 V at a constant current of 1 $C_n$. This was the first cycle, and multiple cycles were performed on the battery under the above conditions. The capacity retention rate of a fresh lithium ion battery (i.e., the lithium ion battery that has completed the aforementioned manufacturing process and is ready for shipping) and the battery after 200 and 400 cycles were calculated separately. The capacity retention rate after the cycle is calculated according to a formula below:

Capacity retention rate after the cycle=(Discharge capacity of a corresponding cycle/Discharge capacity of the first cycle)×100%

(4) Test Method for Voltage Drop of Lithium Ion Battery

At 25° C., the lithium ion battery was charged to 4.45 V at a constant current of 1 C and then to a current of 0.05 C at a constant voltage, discharged to 3.2 V at a constant current of 1 C, and allowed to stand for 5 minutes. Then the voltage was tested, and after 24 hours of storage at 85° C., the voltage was tested again. The voltage drop of the lithium-ion battery is calculated according to the formula below:

Voltage drop=Voltage before storage−Voltage after storage.

(5) Intermittent Cycle Test Method of Lithium Ion Battery

At 50° C., the lithium ion battery was charged to 4.45 V at a constant voltage of 0.5 C and then to a cut-off current of 0.05 C at a constant current, allowed to stand for 20 hours, and then discharged to 3.0 V at a constant current of 0.5 C. Multiple charge/discharge cycles were performed on the battery under the above conditions. The capacity retention rate of a fresh lithium ion battery, and the battery after 30, 50, and 100 cycles were calculated separately. The capacity retention rate after the cycle is calculated according to a formula below:

Capacity retention rate after the cycle=(Discharge capacity of a corresponding cycle/Discharge capacity of the first cycle)×100%

3. Test Results (1) Effect of the Fluorinated Cyclic Carbonate and the Multi-Nitrile Compound Having an Ether Bond on the Performance of the Lithium Ion Battery Table 1 compares the performance of a lithium ion battery (Comparative Example D1-1) prepared with an electrolyte containing no fluorinated cyclic carbonate and no multi-nitrile compound having an ether bond, and lithium ion batteries (Examples S1-1 and S1-2) prepared with an electrolyte comprising a fluorinated cyclic carbonate and a multi-nitrile compound having an ether bond according to the present application.

TABLE 1

| Example S/Comparative Example D | Fluorinated cyclic carbonate (wt %) | Multi-nitrile compound having an ether bond (wt %) | Thickness expansion rate after storage at 60° C. | Time (hours) of floating-charge to failure at 50° C. |
|---|---|---|---|---|
| S1-1 | 0.2% A1 | 0.1% B1 | 6.8% | 420 |
| S1-2 | 2% A1 | 1% B1 | 4.3% | 540 |
| D1-1 | — | — | 25.0% | 90 |

As shown in Table 1, Examples S1-1 and S1-2 have significantly reduced thickness expansion rate after storage at 60° C. and/or significantly increased time of floating-charge to failure at 45° C. compared with Comparative Example D1-1.

Table 2 shows the compositions of the electrolytes used in respective comparative examples and examples, and the performance of lithium ion batteries, in which the content of each component is based on the total weight of the electrolyte.

TABLE 2

| Example S/Comparative Example D | Cyclic carbonate | Multi-nitrile compound | Thickness expansion rate after storage at 60° C. | Time (hours) of floating-charge to failure at 50° C. |
|---|---|---|---|---|
| S1-4 | 4% A1 | 1% B1 | 5.5% | 519 |
| D1-1 | — | — | 25.0% | 90 |
| D1-2 | 4% A1 | — | 23.4% | 160 |
| D1-3 | — | 1% B1 | 17.3% | 256 |
| D1-4 | 1% VC | 1% SN | 21.4% | 178 |
| D1-5 | 4% A1 | 1% SN | 13.7% | 367 |
| D1-6 | 1% VC | 1% EDN | 16.5% | 216 |
| D1-7 | 1% VC | 1% B1 | 15.6% | 318 |
| D1-8 | 4% VC | 1% B1 | 23.7% | 320 |

As shown in Table 2, the electrolytes of Example S1-4 contain the fluorinated cyclic carbonate A1 and the multi-nitrile compound having an ether bond B1. The electrolyte of Comparative Example D1-1 does not contain a fluorinated cyclic carbonate and a multi-nitrile compound having an ether bond. The electrolyte of Comparative Example D1-2 merely contains the fluorinated cyclic carbonate (A1). The electrolyte of Comparative Example D1-3 merely contains the multi-nitrile compound having an ether bond (B1). The electrolyte of Comparative Example D1-4 contains the non-fluorinated cyclic carbonate (VC) and the multi-nitrile compound having no ether bond (SN). The electrolyte of Comparative Example D1-5 contains the fluorinated cyclic carbonate (A1) and the multi-nitrile compound having no ether bond (SN). The electrolytes of Comparative Examples D1-6, D1-7, and D1-8 contain the non-fluorinated cyclic carbonate (VC) and the multi-nitrile compound having an ether bond (EDN or B1).

The results show that the lithium ion battery (Example S1-4) prepared with an electrolyte containing a fluorinated cyclic carbonate and a multi-nitrile compound having an ether bond according to the present application has a significantly lower thickness expansion rate after storage at 60° C. and/or a significantly higher time of floating-charge to failure at 50° C. than the lithium ion batteries (Comparative Examples D1-1 to D1-8) prepared with an electrolyte containing no fluorinated cyclic carbonate and or no multi-nitrile compound having an ether bond. That is, the lithium ion battery produced with the electrolyte of the present application has more excellent storage and/or floating-charge performance.

(2) Effect of the Weight Percentage ($C_f$) of the Fluorinated Cyclic Carbonate and the Weight Percentage ($C_n$) of the Multi-Nitrile Compound Having an Ether Bond on the Performance of Lithium Ion Batteries Table 3 shows the compositions of the electrolytes used in respective comparative examples and examples, and the storage and floating-charging performance of lithium ion batteries.

TABLE 3

| Example S/ Comparative Example D | Fluorinated cyclic carbonate | Multi-nitrile compound having an ether bond | Thickness expansion rate after storage at 60° C. | Time (hours) of floating-charge to failure at 50° C. |
|---|---|---|---|---|
| S1-1 | 0.2% A1 | 0.1% B1 | 6.8% | 420 |
| S1-2 | 2% A1 | 1% B1 | 4.3% | 540 |
| S1-3 | 3% A1 | 1% B1 | 5.4% | 520 |
| S1-4 | 4% A1 | 1% B1 | 5.5% | 519 |
| S1-5 | 5% A1 | 1% B1 | 5.8% | 521 |
| S1-6 | 6% A1 | 1% B1 | 6.3% | 517 |
| S1-7 | 10% A1 | 0.5% B1 | 7.5% | 480 |
| S1-8 | 5% A1 | 2% B1 | 4.8% | 620 |
| S1-9 | 4% A1 | 2% B1 | 4.1% | 780 |
| S1-10 | 4% A2 | 2% B2 | 4.3% | 660 |
| S1-11 | 4% A2 | 0.5% B2 | 5.8% | 490 |
| S1-12 | 4% A2 | 0.2% B2 | 6.3% | 469 |
| S1-13 | 4% A3 | 2% B3 | 4.4% | 580 |
| S1-14 | 2% A3 | 1% B3 | 5.3% | 520 |
| S1-15 | 2% A4 | 1% B4 | 5.4% | 510 |
| S1-16 | 2% A1 | 1% Compound 1A | 4.1% | 598 |
| S1-17 | 2% A2 | 1% Compound 1A | 4.3% | 591 |
| S1-18 | 11% A1 | 2% B1 | 8.5% | 489 |
| S1-19 | 10% A1 | 5% B1 | 8.8% | 450 |
| S1-20 | 10% A1 | 0.4% B1 | 9.1% | 467 |
| S1-21 | 10% A1 | 0.2% B1 | 10.6% | 435 |
| D1-9 | 1% A1 | 5% B1 | 12.1% | 340 |

As shown in Table 3, $C_f$ is less than $C_n$ in the electrolyte used in Comparative Example D1-9. The results of Examples S1-1 to S1-21 in Table 3 indicate that compared with Comparative Example D1-9, when $C_f$ and $C_n$ in the electrolyte were adjusted to satisfy $C_f > C_n$, the lithium ion battery prepared with the electrolyte of the present application has a lower thickness expansion rate after storage at 60° C. and/or a higher time of floating-charge to failure at 50° C. Compared with Examples S1-18 and S1-19, when $C_f$ and $C_n$ satisfy about 0.3 wt %≤($C_f$+$C_1$)≤ about 12 wt %, the lithium ion battery prepared with the electrolyte of the present application has a significantly lower thickness expansion rate after storage at 60° C. and/or a significantly higher time of floating-charge to failure at 50° C. Compared with Examples S1-20 and S1-21, when $C_f$ and $C_n$ satisfy about 1≤($C_f$+$C_n$)≤ about 20, the lithium ion battery prepared with the electrolyte of the present application has a significantly lower thickness expansion rate after storage at 60° C. and/or a significantly higher time of floating-charge to failure at 50° C. When $C_f$ and $C_n$ satisfy about 2 wt %≤($C_f$+$C_n$)≤ about 8 wt % and/or about 2≤($C_f$/$C_n$)≤ about 10, the fluorinated cyclic carbonate and multi-nitrile compound having an ether bond exhibit an synergistic effect, and the lithium ion battery prepared therewith has exceptionally excellent high temperature storage and/or floating-charge performance. The above results show that the lithium ion battery produced with the electrolyte of the present application has excellent storage and/or floating-charge performance over the prior art.

(3) Effect of Fluoroether on the Performance of the Lithium Ion Battery

Table 4 shows the performance of lithium ion batteries prepared by adding different weight percentages of fluoroether to an electrolyte containing 4 wt % fluorinated cyclic carbonate (A1) and 1 wt % multi-nitrile compound having an ether bond (B1).

TABLE 4

| Example S/ Comparative Example D | Fluoroether | DC internal resistance (mohm) of fresh battery at 20% SOC | 21-day thickness expansion rate at 60° C. |
|---|---|---|---|
| S1-4 | — | 62.1 | 8.3% |
| S2-1 | 0.1% D1 | 49.2 | 5.6% |
| S2-2 | 0.5% D1 | 48.8 | 5.3% |
| S2-3 | 1% D1 | 47.6 | 4.8% |
| S2-4 | 2% D1 | 47.4 | 4.3% |
| S2-5 | 3% D1 | 47.7 | 4.3% |
| S2-6 | 4% D1 | 48.2 | 4.4% |
| S2-7 | 5% D1 | 49.3 | 4.5% |
| S2-8 | 1% D2 | 49.2 | 4.7% |
| S2-9 | 1% D3 | 48.4 | 4.5% |
| D2-1 | 6% D1 | 50.3 | 7.6% |

As shown by Examples S2-1 to S2-7, as the content of the fluoroether is increased from 0.1 wt % to 5 wt %, the DC internal resistance at 20% SOC and the 21-day thickness expansion rate at 60° C. of the fresh lithium ion battery are further reduced. When the fluoroether content is greater than 5 wt %, the DC internal resistance and the storage performance are slightly deteriorated.

(4) Effect of Cyclic Phosphonic Anhydride on the Performance of the Lithium Ion Battery Table 5 shows the performance of lithium ion batteries prepared by adding different weight percentages of cyclic phosphonic anhydride to an electrolyte containing 4 wt % fluorinated cyclic carbonate A1 and 1 wt % multi-nitrile compound having an ether bond (B1).

TABLE 5

| Example S/ Comparative Example D | Cyclic phosphonic anhydride | Changes of DC internal resistance at 20% SOC | | | Capacity retention rate | | |
|---|---|---|---|---|---|---|---|
| | | Fresh battery | After 200 cycles | After 400 cycles | Fresh battery | After 200 cycles | After 400 cycles |
| S1-4 | — | 62.1 | 78.3 | 112.5 | 100% | 90.1% | 82.1% |
| S3-1 | 0.1% E1 | 47.3 | 51.5 | 88.2 | 100% | 95.7% | 90.1% |
| S3-2 | 0.5% E1 | 45.4 | 47.2 | 81.3 | 100% | 96.2% | 91.3% |
| S3-3 | 1% E1 | 43.6 | 47.1 | 80.5 | 100% | 96.1% | 90.7% |
| S3-4 | 2% E1 | 44.6 | 46.3 | 81.6 | 100% | 95.1% | 89.6% |
| S3-5 | 3% E1 | 44.9 | 49.1 | 88.4 | 100% | 94.7% | 88.4% |
| S3-6 | 1% E2 | 44.2 | 48.3 | 87.3 | 100% | 95.2% | 90.9% |

TABLE 5-continued

| Example S/ Comparative Example D | Cyclic phosphonic anhydride | Changes of DC internal resistance at 20% SOC | | | Capacity retention rate | | |
|---|---|---|---|---|---|---|---|
| | | Fresh battery | After 200 cycles | After 400 cycles | Fresh battery | After 200 cycles | After 400 cycles |
| S3-7 | 1% E3 | 45.3 | 47.7 | 88.5 | 100% | 95.1% | 90.7% |
| D3-1 | 4% E1 | 46.1 | 58.6 | 104.3 | 100% | 92.0% | 85.3% |

The results show that the addition of cyclic phosphonic anhydride to the electrolyte of the present application can reduce the DC internal resistance of the lithium ion battery before and after the cycle, and improve the storage performance of the lithium ion battery. As shown by Examples S3-1 to S3-7, as the content of cyclic phosphonic anhydride increases from 0.1 wt % to 3 wt %, the DC internal resistance at 20% SOC of the lithium ion battery decreases first and then rises, and the capacity retention rate of the lithium ion battery increases first and then decreases. When the content of cyclic phosphonic anhydride is greater than 3 wt %, the cycle performance is affected, possibly due to the decomposition of the cyclic phosphonic anhydride.

(5) Effect of Fluoroether and Cyclic Phosphonic Anhydride in Combination on the Performance of the Lithium Ion Battery Table 6 shows the performance of lithium ion batteries prepared by adding different weight percentages of fluoroether and cyclic phosphonic anhydride to an electrolyte containing 4 wt % fluorinated cyclic carbonate (A1) and 1 wt % multi-nitrile compound having an ether bond (B1).

TABLE 6

| Example S | Fluoroether D1 | Cyclic phosphonic anhydride E1 | Changes of DC internal resistance at 20% SOC | | | 21-day thickness expansion rate at 60° C. | Capacity retention rate | | |
|---|---|---|---|---|---|---|---|---|---|
| | | | Fresh battery | After 200 cycles | After 400 cycles | | Fresh battery | After 200 cycles | After 400 cycles |
| S1-4 | — | — | 62.1 | 78.3 | 112.5 | 8.3% | 100% | 90.1% | 82.1% |
| S2-3 | 1% | — | 48.8 | 55.2 | 89.7 | 5.3% | 100% | 92.3% | 85.8% |
| S3-3 | — | 1% | 43.6 | 47.1 | 80.5 | 5.1% | 100% | 96.1% | 90.7% |
| S4-1 | 0.1% | 0.5% | 44.6 | 48.7 | 80.5 | 5.7% | 100% | 94.3% | 89.9% |
| S4-2 | 1% | 0.5% | 43.3 | 45.4 | 80.2 | 5.0% | 100% | 95.3% | 90.2% |
| S4-3 | 1% | 0.3% | 43.8 | 47.5 | 78.9 | 4.0% | 100% | 95.8% | 90.5% |
| S4-4 | 1% | 0.1% | 46.1 | 50.4 | 85.5 | 4.2% | 100% | 94.7% | 90.7% |
| S4-5 | 3% | 2% | 42.6 | 47 | 80.7 | 3.7% | 100% | 94.1% | 89.2% |

The results show that the addition of fluoroether and cyclic phosphonic anhydride to the electrolyte of the present application can further reduce the DC internal resistance of the lithium ion battery before and after the cycle, and improve the storage performance of the lithium ion battery.

(6) Effect of Other Additives on the Performance of the Lithium Ion Battery

Table 7 shows the performance of lithium ion batteries prepared by adding different weight percentages of other additives to an electrolyte containing 4 wt % fluorinated cyclic carbonate (A1) and 1 wt % multi-nitrile compound having an ether bond (B1).

TABLE 7

| Example S/ Comparative Example D | VC | VEC | PS | DTD | Dinitrile | Voltage drop (V) after storage at 3.2 V and 85° C. for 24 hours |
|---|---|---|---|---|---|---|
| S1-4 | — | — | — | — | — | 0.37 |
| S5-1 | 0.5% | — | — | — | — | 0.32 |
| S5-2 | 0.5% | — | 3% | — | — | 0.29 |
| S5-3 | 0.5% | — | 3% | 0.5% | — | 0.2 |
| S5-4 | 1% | — | 3% | — | — | 0.27 |
| S5-5 | 1% | — | 3% | 0.5% | — | 0.17 |
| S5-6 | — | 0.5% | 3% | 0.5% | — | 0.22 |
| S5-7 | — | — | 3% | — | — | 0.31 |
| S5-8 | — | — | — | 0.5% | — | 0.25 |
| S5-9 | 0.5% | — | 3% | — | 2% SN | 0.15 |
| S5-10 | — | — | — | — | 2% ADN | 0.3 |
| S5-11 | — | — | 3% | — | 2% EDN | 0.21 |

The results show that the addition of film-forming additives such as VC, VEC, PS, SN, ADN, DTD and EDN to the electrolyte of the present application can further improve the SEI stability of the lithium ion battery and suppress the voltage drop of the lithium ion battery. The combined use of various additives is beneficial to the further improvement of the stability of the lithium ion battery, facilitates the long-term storage of the lithium ion battery, and improves the reliability of the lithium ion battery.

(7) Effect of Carboxylate on the Performance of the Lithium Ion Battery

Table 8 shows the performance of lithium ion batteries prepared by adding different weight percentages of carboxylate to an electrolyte containing 4 wt % fluorinated cyclic carbonate (A1) and 1 wt % multi-nitrile compound having an ether bond (B1).

TABLE 8

Capacity retention rate after intermittent cycle

| Example S | Carboxylate | Fresh battery | After 30 cycles | After 50 cycles | After 100 cycles |
|---|---|---|---|---|---|
| S1-4 | 0 | 100% | 73.3% | 64.0% | 53.9% |
| S6-1 | 1% H1 | 100% | 81.7% | 73.8% | 63.9% |
| S6-2 | 10% H1 | 100% | 83.5% | 78.7% | 76.2% |
| S6-3 | 20% H1 | 100% | 85.7% | 80.5% | 77.8% |
| S6-4 | 30% H1 | 100% | 87.4% | 82.6% | 78.9% |
| S6-5 | 40% H1 | 100% | 86.5% | 79.7% | 74.9% |
| S6-6 | 50% H1 | 100% | 84.6% | 77.4% | 72.1% |
| S6-7 | 60% H1 | 100% | 82.3% | 75.8% | 70.5% |
| S6-8 | 10% H2 | 100% | 81.6% | 75.4% | 72.4% |
| S6-9 | 20% H2 | 100% | 85.3% | 80.1% | 77.2% |
| S6-10 | 30% H2 | 100% | 87.3% | 82.1% | 78.2% |
| S6-11 | 40% H2 | 100% | 86.2% | 79.1% | 74.4% |
| S6-12 | 50% H2 | 100% | 83.6% | 75.6% | 71.2% |
| S6-13 | 60% H2 | 100% | 81.5% | 74.6% | 69.9% |
| S6-14 | 10% H3 | 100% | 81.9% | 75.1% | 71.6% |

As shown by Examples S6-1 to S6-13, as the carboxylate content increases, the capacity retention rate after the intermittent cycle of the lithium ion battery is increased. When the carboxylate content is close to 60 wt %, the intermittent cycle performance of the lithium ion battery is affected, mainly due to the side reactions between $LiPF_6$ and the carboxylate. Therefore, when a carboxylate is used, the content thereof needs to be adjusted properly.

(8) Effect of Electrode Compaction Density on the Performance of the Lithium Ion Battery Table 9 shows the performance at various compaction ratios (D1/D2) of lithium ion batteries prepared with an electrolyte containing 4 wt % fluorinated cyclic carbonate (A1), 1 wt % multi-nitrile compound having an ether bond (B1) and 30 wt % propyl propionate.

| Example S/Comparative Example D | Compaction density ratio (D1/D2) | Capacity retention rate | | |
|---|---|---|---|---|
| | | Fresh battery | After 200 cycles | After 400 cycles |
| S7-1 | 0.8 | 100% | 93.4% | 88.8% |
| S7-2 | 0.9 | 100% | 95.0% | 89.9% |
| S7-3 | 0.95 | 100% | 95.9% | 90.7% |
| S7-4 | 1 | 100% | 96.8% | 91.2% |
| S7-5 | 1.05 | 100% | 95.8% | 90.6% |
| S7-6 | 1.1 | 100% | 94.9% | 89.9% |
| S7-7 | 1.2 | 100% | 93.5% | 88.6% |
| D7-1 | 1.3 | 100% | 90.7% | 83.4% |
| D7-2 | 0.7 | 100% | 90.3% | 82.5% |

The results show that the electrode compaction density ratio of the lithium ion battery (electrode compaction density D1 of single-sided coating/electrode compaction density D2 of double-sided coating) has a significant effect on the cycle performance of the lithium ion battery. A too large or too small D1/D2 will damage the cycle performance of the lithium-ion battery. When D1/D2 is between about 0.8 and about 1.2, the lithium ion battery attains an excellent performance (as shown by Examples S7-1 to S7-7). When D1/D2 is between about 0.9 and about 1.1, the lithium ion battery attains an exceptionally excellent performance (as shown by Examples S7-2 to S7-6). When D1/D2 is greater than about 1.2 or less than about 0.8, the performance of the lithium ion battery is poor (as shown by Comparative Examples D7-1 and D7-2).

Table 10 shows the performance at various compaction density ratios D1/D2 of lithium ion batteries prepared by adding different weight percentages of fluoroether and/or cyclic phosphonic anhydride to an electrolyte containing 4 wt % fluorinated cyclic carbonate (A1) and 1 wt % multi-nitrile compound having an ether bond (B1).

TABLE 10

| Example S | Fluoro-ether D1 | Cyclic phosphonic anhydride E1 | Compaction density ratio (D1/D2) | Capacity retention rate | | |
|---|---|---|---|---|---|---|
| | | | | Fresh battery | After 200 cycles | After 400 cycles |
| S8-1 | 1% | — | 0.8 | 100% | 94.9% | 89.7% |
| S8-2 | 1% | — | 1 | 100% | 97.1% | 91.8% |
| S8-3 | 1% | — | 1.2 | 100% | 94.3% | 89.6% |
| S8-4 | — | 0.3% | 0.8 | 100% | 93.9% | 89.2% |
| S8-5 | — | 0.3% | 1 | 100% | 97.6% | 92.2% |
| S8-6 | — | 0.3% | 1.2 | 100% | 93.7% | 89.1% |
| S8-7 | 1% | 0.3% | 1 | 100% | 98.1% | 93.1% |

The results show that the lithium ion battery achieves a further improved cycle performance when the compaction density ratio (D1/D2) is between about 0.8 and about 1.2 after the addition of fluoroether and/or cyclic phosphonic anhydride to the electrolyte of the present application.

References throughout the specification to "some embodiments", "partial embodiments", "one embodiment", "another example", "example", "specific example" or "partial examples" mean that at least one embodiment or example of the application comprises specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

While the illustrative embodiments have been shown and described, it will be understood by those skilled in the art that the embodiments are not to be construed as limiting the present application, and modifications, substitutions and changes can be made to the embodiments without departing from the spirit and scope of the present application.

The above-described embodiments of the present application are intended to be illustrative only. Numerous alternative embodiments may be devised by persons skilled in the art without departing from the scope of the following claims.

| Abbreviation | |
|---|---|
| Abbreviation | Material Name |
| A1 | Fluoroethylene carbonate |
| A2 | 4,4-difluoroethylene carbonate |
| A3 | 4,5-difluoroethylene carbonate |
| A4 | 4-fluoro-5-methylethylene carbonate |
| ADN | Adiponitrile |
| B1 | 1,2,3-tris(2-cyanoethoxy)propane |
| B2 | 1,2,4-tris(2-cyanoethoxy)butane |
| B3 | 1,2,6-tris(cyanoethoxy)hexane |
| B4 | 1,2,5-tris(cyanoethoxy)pentane |
| D1 | 1,1-difluoro-2,2-difluoroethyl-2',2'-difluoro-3',3'-difluoropropyl ether (FEPE) |
| D2 | 2-trifluoromethyl-3-methoxyperfluoropentane (TMMP) |
| D3 | 2-(trifluoro-2-fluoro-3-difluoropropoxy)-3-difluoro-4-fluoro-5-trifluoropentane (TPTP) |

| Abbreviation | Material Name |
|---|---|
| DTD | 1,2-ethylene sulfate |
| E1 | Cyclic tripropyl phosphonic anhydride (T3P) |
| E2 | Cyclic trimethyl phosphonic anhydride (TM3P) |
| E3 | Cyclic triethyl phosphonic anhydride (TE3P) |
| EDN | Ethylene glycol bis(2-cyanoethyl) ether |
| H1 | Propyl propionate |
| H2 | Ethyl propionate |
| H3 | γ-butyrolactone |
| PS | 1,3-propanesultone |
| SN | Succinonitrile |
| VC | Vinylene carbonate |
| VEC | Vinyl ethylene carbonate |

What is claimed is:

1. An electrolyte, comprising:
a fluorinated cyclic carbonate, a chain carboxylate, a dinitrile compound, and a multi-nitrile compound having an ether bond; wherein based on a total weight of the electrolyte, a weight percentage ($C_f$) of the fluorinated cyclic carbonate is greater than a weight percentage ($C_n$) of the multi-nitrile compound having an ether bond; wherein,
the dinitrile compound comprises at least one selected from the group consisting of succinonitrile, adiponitrile, and ethylene glycol bis(2-cyanoethyl) ether; and,
the multi-nitrile compound having an ether bond is selected from at least one of the group consisting of 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, and 1,2,5-tris(cyanoethoxy)pentane;
wherein the electrolyte further comprises at least one of a cyclic carbonate having a carbon-carbon double bond within the range of 0.01 wt % to 0.5 wt %, a fluorinated chain carbonate, and a compound having a sulfur-oxygen double bond.

2. The electrolyte according to claim 1, wherein based on the total weight of the electrolyte, 0.1 wt %<$C_f$≤10 wt %, and 1 wt %<$C_n$≤5 wt %.

3. The electrolyte according to claim 1, wherein the multi-nitrile compound having an ether bond is selected from a compound represented by General Formula [1]:

General Formula [1]

wherein,
$R_1$, $R_2$, and $R_3$ each represent —$(CH_2)_a$—CN or —$(CH_2)_b$—O—$(CH_2)_c$—CN;
$R_4$ represents hydrogen, an alkyl group having 1-5 carbon atoms, —$(CH_2)_a$—CN, or —$(CH_2)_b$—O—$(CH_2)_c$—CN;
at least one of $R_1$, $R_2$, $R_3$, and $R_4$ is —$(CH_2)_b$—O—$(CH_2)_c$—CN; and
a, b and c are each independently an integer from 0 to 10.

4. The electrolyte according to claim 1, wherein the multi-nitrile compound having an ether bond comprises Compound 1A:

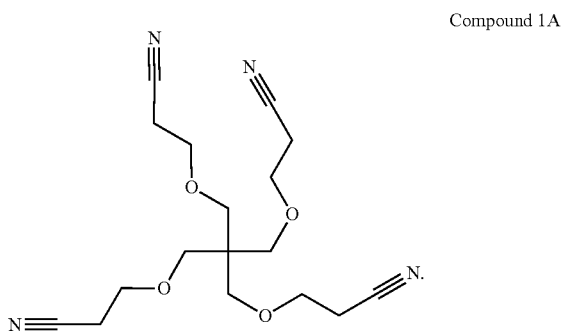 [SMILES: N#CCCOCC(COCCC#N)(COCCC#N)COCCC#N]

Compound 1A

5. The electrolyte according to claim 1, wherein the fluorinated cyclic carbonate is selected from a fluorinated cyclic carbonate having an alkylene group with 2-6 carbon atoms.

6. The electrolyte according to claim 1, wherein the fluorinated cyclic carbonate is at least one selected from the group consisting of fluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

7. The electrolyte according to claim 1, wherein the chain carboxylate comprises propyl propionate; wherein, based on the total weight of the electrolyte, the propyl propionate has a content of about 10 wt %-about 50 wt % electrolyte.

8. The electrolyte according to claim 1, wherein the electrolyte further comprises a fluoroether selected from compounds represented by General Formula [2], [3], [4] or [5]:

$$Rf1\text{-}O\text{-}Rf2 \qquad [2],$$

$$Rf1\text{-}O\text{-}R \qquad [3],$$

$$Rf1\text{-}O\text{-}(R'\text{-}O)_n\text{-}Rf2 \qquad [4],$$

$$Rf1\text{-}O\text{-}(R'\text{-}O)_n\text{-}R \qquad [5],$$

or a combination thereof,
where:
in Formulas [2], [3], [4], and [5], Rf1 and Rf2 are each independently a linear or branched $C_1$ to $C_{12}$ fluoroalkyl group having at least one hydrogen atom replaced by fluorine, R is a linear or branched $C_1$ to $C_{12}$ alkyl group, and R' is a linear or branched $C_1$ to $C_5$ alkylene group, and n is an integer from 1 to 5.

9. The electrolyte according to claim 1, wherein the electrolyte further comprises a cyclic phosphonic anhydride selected from compounds represented by General Formula [6]:

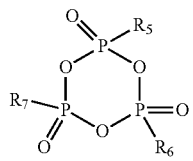

General Formula [6]

where:
R$_5$, R$_6$ and R$_7$ are each independently selected from hydrogen, an alkyl group having 1-20 carbon atoms, or an aryl group having 6-26 carbon atoms, and
R$_5$, R$_6$ and R$_7$ are identical to or different from each other or any two of them are identical.

10. The electrolyte according to claim 1, wherein the electrolyte further comprises at least one of a cyclic carbonate, a chain carbonate, a cyclic carboxylate, a cyclic ether, a chain ether, a phosphorus-based organic solvent, a sulfur-containing organic solvent, and an aromatic fluorine-containing solvent.

11. An electrochemical device, comprising an electrode and an electrolyte, wherein the electrolyte comprising:
a fluorinated cyclic carbonate, a chain carboxylate, a dinitrile compound and a multi-nitrile compound having an ether bond, wherein based on a total weight of the electrolyte, a weight percentage ($C_f$) of the fluorinated cyclic carbonate is greater than a weight percentage ($C_n$) of the multi-nitrile compound having an ether bond; wherein,
the dinitrile compound comprises at least one selected from the group consisting of succinonitrile, adiponitrile, and ethylene glycol bis(2-cyanoethyl) ether; and,
the multi-nitrile compound having an ether bond is selected from at least one of the group consisting of 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, and 1,2,5-tris(cyanoethoxy)pentane;
wherein the electrolyte further comprises at least one of a cyclic carbonate having a carbon-carbon double bond within the range of 0.01 wt % to 0.5 wt %, a fluorinated chain carbonate, and a compound having a sulfur-oxygen double bond.

12. The electrochemical device according to claim 11, wherein the chain carboxylate comprises at least one of ethyl acetate, propyl acetate, ethyl propionate, or propyl propionate, present in a content of about 1 wt %-about 60 wt % based on the total weight of the electrolyte.

13. The electrochemical device according to claim 12, wherein the chain carboxylate comprises propyl propionate, and based on the total weight of the electrolyte, the propyl propionate has a content of about 10 wt %-about 50 wt % electrolyte.

14. The electrochemical device according to claim 11, wherein the electrode comprises a current collector and a coating, and the coating is at least one selected from the group consisting of:
a single-sided coating formed by coating a slurry only on one surface of the current collector; and
a double-sided coating formed by coating a slurry on two opposing surfaces of the current collector,
wherein the electrode including the single-sided coating has an electrode compaction density D1, the electrode including the double-sided coating has an electrode compaction density D2.

15. The electrochemical device according to claim 14, wherein the coating includes the double-sided coating formed by coating the slurry on two opposing surfaces of the current collector; the electrodes comprise a cathode or an anode; where when the electrode is a cathode, about 3.5 g/cm$^3$≤D2≤about 4.3 g/cm$^3$; or when the electrode is an anode, about 1.2 g/cm$^3$≤D2≤about 1.8 g/cm$^3$.

16. An electronic device, comprising an electrochemical device, the electrochemical device comprising an electrode and an electrolyte, wherein the electrolyte comprising:
a fluorinated cyclic carbonate, a chain carboxylate, a dinitrile compound and a multi-nitrile compound having an ether bond, wherein based on a total weight of the electrolyte, a weight percentage ($C_f$) of the fluorinated cyclic carbonate is greater than a weight percentage ($C_n$) of the multi-nitrile compound having an ether bond; wherein,
the dinitrile compound comprises at least one selected from the group consisting of succinonitrile, adiponitrile, and ethylene glycol bis(2-cyanoethyl) ether; and,
the multi-nitrile compound having an ether bond is selected from at least one of the group consisting of 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, and 1,2,5-tris(cyanoethoxy)pentane;
wherein the electrolyte further comprises at least one of a cyclic carbonate having a carbon-carbon double bond within the range of 0.01 wt % to 0.5 wt %, a fluorinated chain carbonate, and a compound having a sulfur-oxygen double bond.

17. The electrochemical device according to claim 11, wherein the electrode comprises a current collector of two different regions, each region coated with either a single-sided coating or a double-sided coating, wherein the single-sided coating is formed by coating a slurry only on one surface of the current collector; and the double-sided coating is formed by coating a slurry on two opposing surfaces of the current collector,
wherein the electrode including the single-sided coating has an electrode compaction density D1, the electrode including the double-sided coating has an electrode compaction density D2, and D1 and D2 satisfy the relationship: about 0.8≤D1/D2≤about 1.2.

18. The electrolyte according to claim 1, wherein the chain carboxylate comprises at least one of the group selected from ethyl propionate and propyl propionate; wherein, based on the total weight of the electrolyte, at least one of the group selected from ethyl propionate and propyl propionate present in a content of about 30 wt %-about 60 wt %.

19. The electrolyte according to claim 1, wherein the chain carboxylate comprises propyl propionate; wherein, based on the total weight of the electrolyte, the propyl propionate has a content of about 20 wt %-about 50 wt %.

20. The electrolyte according to claim 1, wherein the chain carboxylate comprises propyl propionate; wherein, based on the total weight of the electrolyte, the propyl propionate has a content of about 40 wt %-about 50 wt %.

21. The electrolyte according to claim 1, wherein based on the total weight of the electrolyte, 0.1 wt %<$C_f$≤10 wt %, and 0.1 wt %≤$C_n$<1 wt %.

22. The electrolyte according to claim 1, wherein $3<C_f/C_n<6$.